US010607162B2

(12) United States Patent
Philip et al.

(10) Patent No.: US 10,607,162 B2
(45) Date of Patent: Mar. 31, 2020

(54) METHODS AND SYSTEMS FOR SCHEDULE-BASED AND ALERT-BASED CLEANING OF PV SYSTEMS

(71) Applicant: SunEdison, Inc., Maryland Heights, MO (US)

(72) Inventors: Joseph Philip, Washington, DC (US); Andras Boross, Belmont, CA (US); Stephen James Voss, Louisville, CO (US); Christopher Andrew Clarke, Greenwood Village, CO (US); Anastasios Golnas, Annapolis, MD (US); Nagendra Cherukupalli, Cupertino, CA (US)

(73) Assignee: FTC Solar, Inc., Austin, TX (US)

( * ) Notice: Subject to any disclaimer, the term of this patent is extended or adjusted under 35 U.S.C. 154(b) by 1152 days.

(21) Appl. No.: 14/878,325

(22) Filed: Oct. 8, 2015

(65) Prior Publication Data

US 2016/0104084 A1    Apr. 14, 2016

Related U.S. Application Data

(60) Provisional application No. 62/062,027, filed on Oct. 9, 2014.

(51) Int. Cl.
*G06Q 10/06* (2012.01)
*H02S 50/00* (2014.01)

(52) U.S. Cl.
CPC ........ *G06Q 10/06311* (2013.01); *H02S 50/00* (2013.01)

(58) Field of Classification Search
CPC ........................... G06Q 10/06311; H02S 50/00
See application file for complete search history.

(56) References Cited

U.S. PATENT DOCUMENTS 8,323,421 B2 *  12/2012  Lee ................. B08B 1/008
                                                134/56 R
8,473,250 B2 *   6/2013  Adest .............. G01D 4/004
                                                702/182

(Continued)

FOREIGN PATENT DOCUMENTS

WO    2013158847 A1    10/2013
WO    2014081967 A1     5/2014

OTHER PUBLICATIONS

International Search Report and Written Opinion of the International Searching Authority dated Jan. 15, 2016 regarding PCT/US2015/054850; 11 pgs.

*Primary Examiner* — Charles R Kasenge
(74) *Attorney, Agent, or Firm* — Armstrong Teasdale LLP

(57) ABSTRACT

A method for scheduling cleaning of a photovoltaic ("PV") system is implemented by a soiling monitoring computer system. The method includes determining a soiling level and a soiling rate for a photovoltaic (PV) system, calculating a cost associated with cleaning the PV system at each of a plurality of possible cleaning times, determining an expected energy output gain associated with cleaning the PV system at each of the plurality of possible times based on the soiling level and the soiling rate, calculating an expected benefit associated with cleaning the PV system at each of the plurality of possible cleaning times based on the expected energy output gain associated with each possible cleaning time, determining a first time of the plurality of possible times when the expected benefit exceeds the cost, and scheduling a cleaning time based on at least the determined first time.

32 Claims, 9 Drawing Sheets

(56) References Cited

U.S. PATENT DOCUMENTS

| | | | |
|---|---|---|---|
| 8,474,084 B2* | 7/2013 | Pak | F24S 50/00 15/21.1 |
| 8,951,356 B2* | 2/2015 | Fisher | G06Q 50/06 134/18 |
| 9,020,636 B2* | 4/2015 | Tadayon | B25J 5/02 700/247 |
| 9,457,463 B2* | 10/2016 | Tadayon | B25J 5/02 |
| 9,564,853 B2* | 2/2017 | Gostein | H02S 50/00 |
| 9,590,559 B2* | 3/2017 | Jarnason | H02S 50/10 |
| 9,608,563 B2* | 3/2017 | Carretero Batista | G01R 21/00 |
| 10,079,572 B2* | 9/2018 | Singh | H02S 50/00 |
| 2009/0266353 A1* | 10/2009 | Lee | B08B 1/008 126/593 |
| 2010/0212093 A1* | 8/2010 | Pak | F24S 50/00 15/97.1 |
| 2010/0308662 A1* | 12/2010 | Schatz | H02J 3/385 307/80 |
| 2011/0138609 A1 | 6/2011 | Cherukupalli | |
| 2011/0208372 A1* | 8/2011 | Hansen | G05F 1/67 700/297 |
| 2011/0265840 A1* | 11/2011 | Sela | G01J 1/18 136/244 |
| 2012/0152877 A1* | 6/2012 | Tadayon | B25J 5/02 212/224 |
| 2012/0310427 A1* | 12/2012 | Williams | G05F 1/67 700/287 |
| 2013/0048026 A1* | 2/2013 | Lee | B08B 1/008 134/18 |
| 2013/0159064 A1* | 6/2013 | Fisher | G06Q 50/06 705/7.36 |
| 2014/0100698 A1 | 4/2014 | Suresh et al. | |
| 2014/0150818 A1* | 6/2014 | Chow | B08B 1/00 134/6 |
| 2014/0188410 A1* | 7/2014 | Kerrigan | H02J 3/383 702/61 |
| 2014/0375343 A1* | 12/2014 | Chen | G01K 13/00 324/750.02 |
| 2015/0217443 A1* | 8/2015 | Tadayon | B25J 5/02 700/253 |
| 2015/0280644 A1* | 10/2015 | Gostein | H02S 50/00 356/72 |

* cited by examiner

METHODS AND SYSTEMS FOR SCHEDULE-BASED AND ALERT-BASED CLEANING OF PV SYSTEMS

CROSS-REFERENCE TO RELATED APPLICATIONS

This patent application claims the benefit of U.S. Provisional Patent Application No. 62/062,027, filed Oct. 9, 2014, the entirety of which is incorporated herein by reference.

FIELD

The field of the disclosure relates generally to cleaning and maintenance of photovoltaic systems. More particularly, this disclosure relates to methods and systems for improved cleaning of photovoltaic systems through the use of dynamic schedules and alerts based partially on a soiling rate and soiling detection. This disclosure also relates to systems for determining such soiling rates.

BACKGROUND

Many photovoltaic systems (PV systems) are exposed to contamination that may cause buildup of residue on the systems. The buildup of this residue is often referred to as "soiling." Soiling interferes with the receipt of solar energy by PV systems and therefore may reduce the total output of the PV systems. Soiling can be removed by cleaning the PV systems, thus enhancing energy production and the financial productivity of PV systems. However, such cleaning may be time-consuming, financially expensive, and require logistical planning and coordination. As a result, determining the time to clean a PV system has significant ramifications for the financial and operational efficiency of the PV system. Further, in some cases, soiling is naturally removed by rainfall while in other cases soiling increases over time. Therefore, methods for scheduling soiling removal should weigh the benefits of soiling removal against the cost of cleaning PV systems. Further, such methods should incorporate the likelihood that soiling will continue to increase (and reduce output of the PV system) or be reduced (by precipitation).

For example, the costs of an early cleaning of a PV system (e.g., when only some small level of soiling has developed) may outweigh the benefit yielded in the form of enhanced energy production. Alternately, the benefits of later cleaning of a PV system (e.g., after significant levels of soiling have developed) may be outweighed by the benefits of enhanced energy production. However, such later cleaning may indicate a missed opportunity to improve energy productions earlier. As a result, scheduling the cleaning of PV systems may have significant impact on the productivity and the economic efficiency of PV systems.

Known methods of scheduling the cleaning of PV systems generally involve simple empirical models with assumptions and minimal optimization. Such methods typically cause a less than ideal cleaning schedule, e.g., early cleaning or late cleaning, rather than an ideal or "just-in-time" cleaning schedule. Accordingly, methods of improved scheduling and incorporating soiling rates would be useful.

This Background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF SUMMARY

In one aspect, a method for scheduling cleaning of a photovoltaic ("PV") system is implemented by a soiling monitoring computer system. The soiling monitoring computer system is in communication with a memory. The method includes determining a soiling level and a soiling rate for a photovoltaic (PV) system, calculating a cost associated with cleaning the PV system at each of a plurality of possible cleaning times, determining an expected energy output gain associated with cleaning the PV system at each of the plurality of possible times based on the soiling level and the soiling rate, calculating an expected benefit associated with cleaning the PV system at each of the plurality of possible cleaning times based on the expected energy output gain associated with each possible cleaning time, determining a first time of the plurality of possible times when the expected benefit exceeds the cost, and scheduling a cleaning time based on at least the determined first time.

In another aspect, a soiling monitoring computer system used to schedule cleaning of a photovoltaic ("PV") system is provided. The soiling monitoring computer system includes a processor and a memory coupled to the processor. The processor is configured to determine a soiling level and a soiling rate for a photovoltaic (PV) system, calculate a cost associated with cleaning the PV system at each of a plurality of possible cleaning times, determine an expected energy output gain associated with cleaning the PV system at each of the plurality of possible times based on the soiling level and the soiling rate, calculate an expected benefit associated with cleaning the PV system at each of the plurality of possible cleaning times based on the expected energy output gain associated with each possible cleaning time, determine a first time of the plurality of possible times when the expected benefit exceeds the cost, and schedule a cleaning time based on at least the determined first time.

Another aspect of the present disclosure is a computer-readable storage media for scheduling cleaning of a photovoltaic ("PV") system. The computer-readable storage media has computer-executable instructions embodied thereon. When executed by at least one processor, the computer-executable instructions cause the processor to determine a soiling level and a soiling rate for a photovoltaic (PV) system, calculate a cost associated with cleaning the PV system at each of a plurality of possible cleaning times, determine an expected energy output gain associated with cleaning the PV system at each of the plurality of possible times based on the soiling level and the soiling rate, calculate an expected benefit associated with cleaning the PV system at each of the plurality of possible cleaning times based on the expected energy output gain associated with each possible cleaning time, determine a first time of the plurality of possible times when the expected benefit exceeds the cost, and schedule a cleaning time based on at least the determined first time.

A further aspect of the present disclosure is a photovoltaic ("PV") cleaning scheduling system used to schedule cleaning of a photovoltaic ("PV") system. The system includes a PV system, a soiling sensor associated with the PV system configured to determine a soiling level and a soiling rate of the PV system, and a soiling monitoring computer system in networked communication with the soiling sensor. The soiling monitoring computer system includes a processor and a memory coupled to the processor. The processor is configured to receive the soiling level and the soiling rate for the photovoltaic (PV) system from the soiling sensor, calculate a cost associated with cleaning the PV system at each of a plurality of possible cleaning times, determine an expected energy output gain associated with cleaning the PV system at each of the plurality of possible times based on the soiling level and the soiling rate, calculate an expected benefit associated with cleaning the PV system at each of the plurality of possible cleaning times based on the expected energy output gain associated with each possible cleaning time, determine a first time of the plurality of possible times when the expected benefit exceeds the cost, and schedule a cleaning time based on at least the determined first time.

In an additional aspect, a soiling sensor is provided. The soiling sensor includes a first reference cell, a second reference cell, a processor in communication with the first reference cell and the second reference cell, and a memory device in communication with the processor. The processor is configured to receive a first measured energy production level from the first reference cell, receive a second measured energy production level from the second reference cell, determine a differential energy production between the first measured energy production level and the second measured energy production level, and determine a soiling level and the soiling rate based on the differential energy production.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

Like reference symbols in the various drawings indicate like elements.

DETAILED DESCRIPTION

Figure 1:
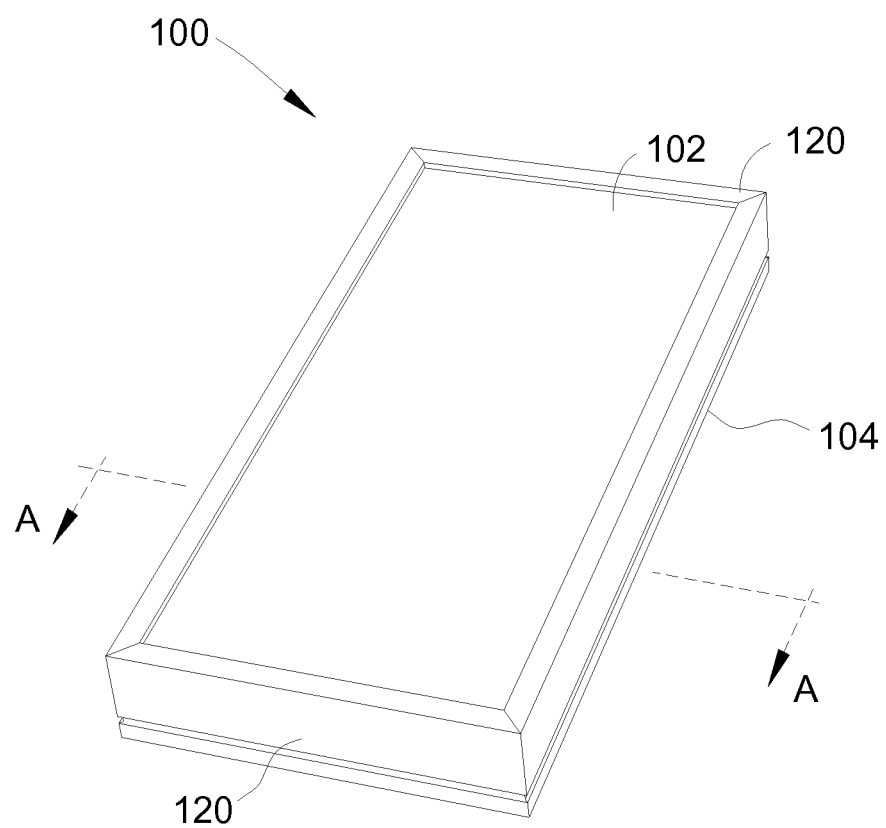
FIG. 1 is a perspective view of an example photovoltaic (PV) module.

Computer systems, such as soiling monitoring computer systems, may include a processor and a memory. However, any processor in a computer device referred to herein may also refer to one or more processors wherein the processor may be in one computing device or a plurality of computing devices acting in parallel. Additionally, any memory in a computer device referred to may also refer to one or more memories, wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor." The term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above are only examples, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium. In an example embodiment, the system is executed on a single computer system, without requiring a connection to a server computer. In a further embodiment, the system is run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

The methods and systems described herein substantially improve the scheduling of cleaning of photovoltaic ("PV") systems. Specifically, the methods described are implemented by a soiling monitoring computer system. The soiling monitoring computer system includes a processor in communication with the memory. The soiling monitoring computer system is configured to: (i) determine a soiling level and a soiling rate for a photovoltaic (PV) system, (ii) calculate a cost associated with cleaning the PV system at each of a plurality of possible cleaning times, (iii) determine an expected energy output gain associated with cleaning the PV system at each of the plurality of possible times based on the soiling level and the soiling rate, (iv) calculate an expected benefit associated with cleaning the PV system at each of the plurality of possible cleaning times based on the expected energy output gain associated with each possible cleaning time, (v) determine a first time of the plurality of possible times when the expected benefit exceeds the cost, (vi) schedule a cleaning time based on at least the determined first time.

The systems and methods described herein schedule the cleaning of PV systems based on soiling rates and soiling levels. In a first example embodiment, the soiling monitoring computer system creates or determines a schedule of cleaning times when benefits of cleaning the PV system are greater (in financial and logistical terms) than the costs of cleaning. In such an embodiment, as described below, the soiling monitoring computer system utilizes historic weather data to determine projected soiling rates and soiling levels used to determine the schedules for cleaning the PV system.

In a second example embodiment, the soiling monitoring computer system generates alerts indicating that the benefits of cleaning a PV system are presently greater than the costs of cleaning. Therefore, in such an embodiment, the soiling monitoring computer system generates alerts suggesting that a cleaning of the PV system should be performed immediately. In a sense, the second example embodiment represents a variation on the first example embodiment wherein the cleaning is scheduled immediately.

In additional example embodiments, the first and second example embodiments may be used together. For example, the soiling monitoring computer system may create or determine a schedule of cleaning times for the PV system and additionally transmit alerts or warnings when the benefits of cleaning a PV system exceed the costs of cleaning. Alternately expressed, the soiling monitoring computer system creates a schedule of cleaning times for the PV system and revises the schedule for earlier cleaning in some cases. Accordingly, the schedule defines periods in which cleaning is economically valuable and, further, points when the benefit of cleaning is maximized. Similarly, feedback from soiling sensors may describe a soiling rate that deviates from the soiling rate that is used in an initially defined schedule. Accordingly, the soiling monitoring computer system may determine the deviation (upon receipt from a soiling sensor) and further alter the schedule and the points in which cleaning benefits are maximized based on the deviation.

In the first example embodiment, the soiling monitoring computer system receives or retrieves the estimated soiling period for the PV system. The estimated soiling period is the period of the year in which soiling of the PV system is likely. The estimated soiling period is received or retrieved from a historical meteorological database containing historical meteorological data for the location of the PV system. The estimated soiling period is determined by processing such historical meteorological data to determine rainy seasons and dry seasons and to identify the dry seasons as estimated soiling periods. Because rainfall is typically a natural cleansing process that removes soiling from PV systems, the estimated soiling period represents dry seasons or dry periods because such dry periods are time periods without rainfall. Therefore, historical meteorological data may be used to identify the expected last date (or dates) of rainfall in a period of time based on previous precipitation events or, phrased alternatively, the beginning of the dry season. Similarly, the historical meteorological data may be used to identify the expected first date (or dates) of rainfall in a period of time based on past precipitation events or, phrased alternatively, the end of the dry season. Because in any particular dry season (or soiling season), the end is not known until it occurs, the end of the dry season must always be estimated. However, as described, the start of the dry (or soiling) season may be determined based on rainfall data and soiling data. Such an estimated soiling period may be explicitly identified in the historical meteorological data or alternately may be inferred by the soiling monitoring computer system by identifying dates and time periods in which a minimum amount of precipitation is not reached. In one example, historical meteorological data for the location of the PV system may indicate that the last rainy period typically ends at the end of February and rain does not typically begin again until October. Therefore, such meteorological data may indicate that the estimated soiling period is during a dry period or a dry season between March and September. Due to historical variations in weather, in some examples outlier events may occur. For example, a rainy day may have occurred in only a few seasons in April. In such examples, the historical meteorological data may be processed to exclude such outlier data (i.e., data that does not correspond to the expected precipitation patterns for the location) using known statistical methods. However, if the rainfall event occurs in a particular April, schedules described herein would be altered to adjust for the revised start of the dry season (or soiling season) while the end date would be unchanged based on this event alone. Accordingly, the optimal cleaning period may be adjusted based on the revised start of the dry season because soiling would begin later and the impact profile over the soiling window would be different than anticipated before the outlier event.

The soiling monitoring computer system also receives an actual soiling start time for the PV system. The actual soiling start time is the date and time that the PV system last experienced rainfall. In one example, an on-site measurement device such as a rain gauge may be used to identify the presence of precipitation. In alternative embodiments, the on-site measurement device may include any suitable device that can identify the presence of precipitation. Such a measurement device is in communication with the soiling monitoring computer system. As new precipitation is detected, the soiling monitoring computer system may update the actual soiling start time because the actual soiling start time is effectively reset by each precipitation event because rain typically acts as a cleaning process for the PV system. However, some amounts of precipitation may be identified by a measurement device and still not be sufficient to clean the PV system. Accordingly, in some examples, the on-site measurement device may be configured to reset the actual soiling start time when a minimum level of precipitation for a given time period is reached. In such examples, the actual soiling start time is therefore not reset unless the minimum level of precipitation for the time period is reached.

The soiling monitoring computer system also calculates a soiling rate for the PV system. In the example embodiment, the soiling rate is determined using a soiling sensor. The soiling sensor includes at least two reference solar cells that are mounted together within a PV module frame. The reference cells are used together in a control and variable model. A first reference cell, the control cell, is scheduled to be cleaned at a particular regular interval and is therefore substantially clean at any point in time. (As explained below, the frequency of cleaning is determined by the desired accuracy of the soiling rate because some amount of soiling may occur between each cleaning event.) Such cleaning may be accomplished through an automatic cleaning system or manual cleaning. In the example embodiment, an automatic cleaning system is used. The automatic cleaning system may include a cleaning arm, a cleaning apparatus, a mechanical wipe, a spray, or a combination thereof. A second reference cell, the variable sensor, is not cleaned. As a result, at any point in time the difference in soiling between the first and second reference cells indicates the amount of soiling that has taken place since the second reference cell (the variable sensor) was last cleaned (i.e., since soiling monitoring began) excepting any intervening soiling that has occurred since the last cleaning of the first reference cell.

The first and second reference cells are constructed and designed in a substantially similar manner and made of substantially the same materials. Further, the first and second reference cells are in the same plane-of-array. Because the soiling sensor is designed to identify soiling rates for the PV system, both reference cells are also in the same plane-of-array as the PV system.

In at least some examples, the soiling sensor also includes standard components of computing devices including a processor, a memory, a storage device, an input, and an output. The input and output may be configured to provide wired or wireless connectivity to other systems. In other examples, the soiling sensor is in communication with an associated computing device. In such examples, the soiling sensor may communicate with the associated computing device via wired or wireless protocols. The associated computing device may further communicate with the soiling monitoring computer system.

In some examples, the soiling sensor is a self-contained unit that may be capable of communicating with any hardware or equipment using known wired or wireless communications protocols. In the example embodiment, the soiling sensor is in wireless communication with the soiling monitoring computer system. Accordingly, the soiling sensor may send and receive information.

To determine the relative difference in output of the first and second reference cells, the energy production of each reference cell is measured as an energy production level. As soiling impacts the number of photons that reach the reference cell and a linear relationship exists between the reference cell current and photons reaching the reference cell, the current of the reference cell is thus a proxy value of the energy production of the system. This proxy value may be referred to as the "energy production value" described herein. In one example wherein the soiling sensor includes networked computing devices, the soiling sensor determines the energy production level for each reference cell and transmits such values to the soiling monitoring computer system using any suitable networking protocol. In a second example, the soiling sensor does not directly determine energy production levels but rather sends the outputted energy for each reference cell to an external system that determines the energy production level for each reference cell and uses such energy production levels to determine an energy production differential. The external system may be the soiling monitoring computer system or a system in communication with the soiling monitoring computer system.

In all such embodiments, the soiling monitoring computer system receives the energy production level for each reference cell and determines the impact of soiling by comparing the energy production levels. More specifically, the difference between the energy production levels for the first and second reference cells is the impact of soiling. More specifically, the difference between the energy production levels for the first and second reference cells is caused by the impact of soiling. In other words, the true impact of soiling is the lower production level of the second reference cell. The soiling monitoring computer system may further derive the soiling rate based on the determined impact of soiling. Generally, the number of photons received by each reference cell is linearly related to the amount of current produced by each reference cell. Therefore, the energy production level is a useful proxy for the energy output associated with each reference cell. Accordingly, the ratio of the energy production levels for each reference cell may be used to determine the percentage of energy production lost by the second reference cell to soiling. The impact of soiling on the energy production level of the second reference cell may be described in Equation 1, below:

$$1 - \left(\frac{E2}{E1}\right) = \% \text{ Energy Loss} \qquad \text{Equation 1}$$

The soiling rate is simply determined by dividing the impact of soiling by the amount of time that has passed since the actual beginning of the soiling period. In such examples, the soiling rate is necessarily linear. In other examples, the soiling rate may be determined as a more complex equation because the soiling rate varies over the period. Accordingly, in alternative examples, the impact of soiling may be determined for several points in time and a suitable method of regression may be determined to define a more general equation that describes the experienced soiling. For example, in some cases the relative ages of the reference cells and/or the PV array may vary. The discrepancy in ages may cause different energy production levels independent of soiling. Accordingly, in such cases, a term may be used in an example equation to account for the relative ages of the reference cells and/or PV array.

As described above, in some examples the automatic cleaning system of the first reference cell may be programmed to clean the first reference cell at a particular interval of time. In other examples, the automatic cleaning system of the first reference cell may be programmed to clean the first reference cell after the measured impact of soiling reaches a minimum threshold. In other words, the automatic cleaning system may be programmed to act when soiling on the first reference cell reaches a minimum threshold level. Such a minimum threshold level may be useful to prevent unnecessary excessive cleaning of the first reference cell when negligible amounts of soiling are on the reference cell. Accordingly, the soiling level may be compared to a minimum threshold level and when the level is not exceeded, the soiling sensor may be configured to wait. Because the soiling sensor may be in communication with the soiling monitoring computer system, the soiling sensor may also be reprogrammed to adjust the scheduling of the cleaning of the first reference cell or to adjust the minimum threshold. Due to the potential costs of cleaning the first reference cell, the use of such controls and minimum thresholds may reduce costs and reduce wear on the automatic cleaning system. Further, the soiling monitoring computer system may send a signal to the soiling sensor to cause the automatic cleaning system to clean the first reference cell "on demand" or at a particular scheduled point in time.

In an alternative embodiment, the soiling rate is determined by the soiling monitoring computer system without using a soiling sensor. Alternatively, the soiling monitoring computer system uses system measurements from the PV system and an irradiance sensor (configured to determine an on-site irradiance measurement) such as a pyranometer or a reference cell. In most examples, the irradiance sensor is not cleaned manually or automatically and is therefore exposed to soiling. Therefore, both the irradiance sensor and the PV system will accumulate soiling. More specifically, the irradiance sensor will record a lower irradiance measurement than the actual irradiance measurement due to soiling effects and the PV system will produce a lower energy production output than would otherwise be produced without soiling. Generally, PV systems experience soiling at a higher rate than irradiance sensors that are exposed to the same conditions. As a result of this discrepancy in soiling rates, the impact of soiling on the PV system can be partially determined based on the uncleaned irradiance sensor. However, such a determined impact will necessarily underestimate the impact of soiling on the PV system because the reference value (i.e., irradiance measurements of the uncleaned irradiance sensor) is affected by soiling. In order to compensate for such an underestimation, the soiling monitoring computer system also utilizes a clear sky model that determines an estimate of soiling on the irradiance sensor. Restated, the soiling monitoring computer system first calculates the relative impact of soiling on the PV system as compared to the uncleaned irradiance sensor and adjusts that relative impact of soiling based on the clear sky model. In one example, the soiling monitoring computer system determines that the PV system is producing an energy output that is X% lower than expected based on the measured irradiance as measured by the uncleaned irradiance sensor. The clear sky model further indicates that the irradiance sensor has been exposed to soiling and is receiving irradiance measurements Y% lower than normal. In one example, the total impact of soiling on the PV system may be determined to be X%+Y%.

Accordingly, in such examples, the irradiance measurement and a DC current value are received by the soiling monitoring computer system. The soiling monitoring computer system also receives a clear sky model. As described above, using the inputs of the irradiance measurement, the DC current value, and the clear sky model, the soiling monitoring computer system estimates a soiling rate. Initially, a first soiling rate is determined as a ratio of DC current to measured irradiance. The first soiling rate is adjusted as described above, using the clear sky model.

The soiling monitoring computer system also determines a plurality of costs associated with cleaning the PV system at a plurality of possible cleaning times. Specifically, the soiling monitoring computer system determines costs for cleaning the system at each available future period based on enterprise level business data. Such enterprise level business data may be retrieved from memory of the soiling monitoring computer system, attached storage, or an external device in communication with the soiling monitoring computer system. The plurality of costs may include material costs, labor costs, fuel costs, and any other suitable category of costs related to the cleaning of PV systems. In some examples, such costs may be dynamic and change based on site location and time. Accordingly, in some examples, the systems and methods may be configured to calculate such costs based on the most recent data for the site location. In other examples, the systems and methods may be configured to retrieve updated cost data on a periodic basis.

The soiling monitoring computer system also determines an expected energy output gain associated with cleaning the PV system at each of the plurality of possible times. As described above and herein, the expected energy output gain is used to determine the economic value associated with cleaning the PV system and identify at least one optimal time period for cleaning the PV system when the economic value of cleaning is maximized. As described above and herein, the soiling monitoring computing system determines the expected energy output gain for the entire period of soiling rather than a particular point in time. In other words, the identified optimal time periods for cleaning are the times that maximize the economic value of cleaning based on the resulting net energy production gains for the entire soiling window. Therefore, if cleaning occurs immediately before rain, the economic benefit would be relatively low because the value was obviated by the naturally occurring cleaning caused by precipitation. Such energy output gains are determined based on the soiling level and the soiling rate. Essentially, energy output gains assume that soiling level is reduced to nearly zero and therefore reflects the difference between energy output at a given time with soiling and energy output at a given time without soiling. In one example embodiment, the soiling monitoring computer system determines a soiling level for each of a plurality of future time periods using the soiling level (at a present time) and the soiling rate. The soiling level at time period t ($sl_t$) described in Equation 2, below, wherein soiling rate sr is a function of time, and the present soiling level is $sl_p$:

$$sl_t = sr(t) + sl_p \qquad \text{Equation 2}$$

The soiling monitoring computer system also receives a projected energy output for the PV system for each of the plurality of future time periods. The projected energy output may be determined based on forecasted irradiance data, historical meteorological data, and historical energy output for the PV system. The plurality of future soiling rates (using the soiling sensor or using the alternative method of a irradiance sensor) are used to adjust projected energy output for the PV system and therefore to determine the expected energy output gain in future periods.

The soiling monitoring computer system also calculates an expected benefit associated with cleaning the PV system at each of the plurality of possible cleaning times based on the expected energy output gain associated with each possible cleaning time. Specifically, the soiling monitoring computer system determines financial benefits of cleaning the system at each available future period based on enterprise level business data stored at memory of the soiling monitoring computer system, attached storage, or an external device in communication with the soiling monitoring computer system. The business data may include, for example, estimated energy production, the economic value of energy, and the costs associated with cleaning the PV system at each of the plurality of possible cleaning times. The estimated energy production data represents the estimated energy production for the PV system assuming that it was not soiled (or that it was cleaned). The value of energy may be determined based on market analysis systems and databases and may include a value that reflects purchase power agreement (PPA) payments, energy credits, and energy incentives. The cost of cleaning may incorporate labor and material costs to cleaning.

The soiling monitoring computer system may compare the expected energy output gain of the PV system to such business data to estimate an economic impact or expected benefit of cleaning the PV system at each of the plurality of possible cleaning times. The expected benefit may be expressed alternatively as the economic impact of the energy output lost based on the soiling impact for each of the plurality of possible cleaning times.

The soiling monitoring computer system also determines a first time of the plurality of possible times when the expected benefit exceeds the cost. In other words, the soiling monitoring computer system identifies the first time at which it is economically efficient to clean the PV system. Accordingly, the soiling monitoring computer system schedules a cleaning time based on at least the determined first time. In other words, the soiling monitoring computer system creates a schedule for cleaning the PV system such that the first time is identified as the first day that a cleaning or maintenance crew should clean the PV system. For a variety of reasons, the soiling monitoring computer system creates the schedule as a window such that each successive time period is an option for cleaning the PV system. In such examples, the window may terminate when the soiling period ends and precipitation naturally cleans the PV system.

Again, the economic impact of cleaning depends on the window definition. In one example, a cleaning may occur (not using the system described herein) one day before a rainfall event occurs. In this example, the benefits of cleaning are low since the rainfall would have quickly cleaned the PV system. Conversely, if the next rainfall event occurs months after the cleaning, the value of cleaning is high. Therefore, the value of cleaning is determined for the entire soiling period (defined as the period between the scheduled cleaning and the next rainfall event) rather than any specific date. As a result, the system estimates the costs over that continual period and, in many examples, assumes increased soiling with and without cleaning.

In at least some examples, the soiling monitoring computer system also utilizes logistical data to determine schedules of cleaning times. Such logistical data may include the availability of human and material resources to perform the cleaning of the PV system. In such examples, the soiling monitoring computer system may compare the expected costs and benefits associated with cleaning other PV systems to prioritize which PV systems should be cleaned first when human or material resources are rare.

In an alternative embodiment, the soiling monitoring computer system may generate alerts indicating that the benefits of cleaning a PV system are presently greater than the costs of cleaning. More specifically, the soiling monitoring computer system monitors the total level of soiling based on the determined impact of soiling. The total level of soiling may be monitored using either the primary example of the soiling sensor or the secondary example that utilizes the irradiance sensor and the clear sky model. In this alternative embodiment, rather than creating and providing a schedule of cleaning times, the soiling monitoring computer system alerts a user or technician that the benefits of cleaning a PV system are presently greater than the costs of cleaning.

In such examples, as the intensity of the impact of soiling increases, the warning or alert may be sent indicating that the PV system should be cleaned immediately. In examples where a soiling sensor is used, the soiling sensor may also be cleaned at the same time.

In additional examples, as the intensity of the impact of soiling increases, a more intense or severe warning signal may also be sent ("progressively intensifying" warning signals). Depending upon the intensity or severity of the warning signal, scheduling of the cleaning of the PV system may further be determined. For example, the warning signal may be a numeric value between 0 and 10. As the warning signal rises from 4 to 8, a maintenance crew may understand that the PV system would be benefited by cleaning. Further, varying intensity or severity of the warning signal allows maintenance crews to prioritize the cleaning between multiple PV systems. In further examples, the soiling sensor may be integrated with a monitoring gateway device. The monitoring gateway device may be configured to transmit the warning signal to operations and maintenance teams.

In at least some examples, the soiling sensor may be configured to send alerts or warnings only after a minimum irradiance level is reached. During a typical day, the soiling sensor may experience a wide variety of irradiance levels. Accordingly, the soiling sensor may be configured to only send alerts or warnings because the "noise" of the signals received by the soiling sensor is too high at irradiance levels below the minimum. In some examples, the minimum irradiance level may be pre-determined while in other examples the minimum irradiance level may be set by the soiling monitoring computer system which transmits the minimum irradiance level to the soiling sensor. In at least some examples, the irradiance level may be detected by a pyranometer included within the soiling sensor. In such examples, the pyranometer is in communication with the soiling sensor and capable of providing information to the soiling sensor and to the soiling monitoring computer system. In other examples, the irradiance level may be detected by an outside service such as an external pyranometer. In such examples, the outside service may communicate to the soiling sensor using known wired or wireless communications protocols. In some examples, the soiling sensor may also be configured to adjust alert levels depending on meteorological forecasts. In such examples, the soiling sensor may receive (directly or via the soiling monitoring computer system) meteorological forecast data from an external service. Such meteorological forecast data may include precipitation forecasts. Because rain may be effective in reducing soiling, in such examples, the alert levels may be reduced.

Further, during low light periods (e.g., from sunset to sunrise), the soiling sensor may not change reporting or alert status. In some examples, the soiling sensor may be specifically programmed to not report or alert during these periods because they are known to be associated with low irradiance levels. Alternately, daily values for irradiance levels may be aggregated when observation values exceed a minimum irradiance level (more than 500 W/m$^2$ in the example embodiment) and used to calculate a daily soiling estimate. The daily soiling estimate may further be used for warnings and alerts. Because soiling typically grows at slow rates, such a daily soiling estimate will identify soiling activity in a timely manner. In some examples, the soiling sensor may be configured to include astronomical equations to determine the actual relative position of the sun at the location of the soiling sensor. As a result, the soiling sensor may also calculate the time of sunrise and sunset to determine when to stop monitoring, alerting, and reporting between sunset and sunrise.

A technical effect of the systems and methods described herein include at least one of (a) improved energy production for PV systems through timely cleaning of soiling; (b) improved utilization of maintenance and cleaning crews; (c) identifying break-even points when the benefit of cleaning a PV system exceeds the costs of cleaning; and (d) prospectively scheduling cleaning of PV systems based on identified break-even points.

More specifically, such technical effects can be achieved by performing at least one of the following steps: (a) determining a soiling level and a soiling rate for a photovoltaic (PV) system; (b) calculating a cost associated with cleaning the PV system at each of a plurality of possible cleaning times; (c) determining an expected energy output gain associated with cleaning the PV system at each of the plurality of possible times based on the soiling level and the soiling rate; (d) calculating an expected benefit associated with cleaning the PV system at each of the plurality of possible cleaning times based on the expected energy output gain associated with each possible cleaning time; (e) determining a first time of the plurality of possible times when the expected benefit exceeds the cost; (f) scheduling a cleaning time based on at least the determined first time; (g) receiving historical meteorological data for a location of the PV system, identifying an expected last seasonal rainfall time based on the received historical meteorological data, identifying an expected first seasonal rainfall time based on the received historical meteorological data, and determining the soiling rate based on the expected last seasonal rainfall time and the expected first seasonal rainfall time; (h) receiving a first measured energy production level from a first reference cell of a soiling sensor, receiving a second measured energy production level from a second reference cell of a soiling sensor, determining a differential energy production between the first measured energy production level and the second measured energy production level, and determining the soiling level and the soiling rate based on the differential energy production; (i) receiving an irradiance level associated with the soiling sensor and determining the soiling rate when the irradiance level exceeds a predefined threshold; (j) receiving an irradiance measurement for a location of the PV system, receiving a direct current output associated with the PV system, and determining the soiling rate by comparing the direct current output to the irradiance measurement; (k) receiving a clear sky model and adjusting the soiling rate based on the clear sky model; and (l) determining that a current expected benefit associated with cleaning the PV system currently exceeds a current cost associated with cleaning the PV system, and transmitting an alert indicating that the PV system should be cleaned.

Figure 2:
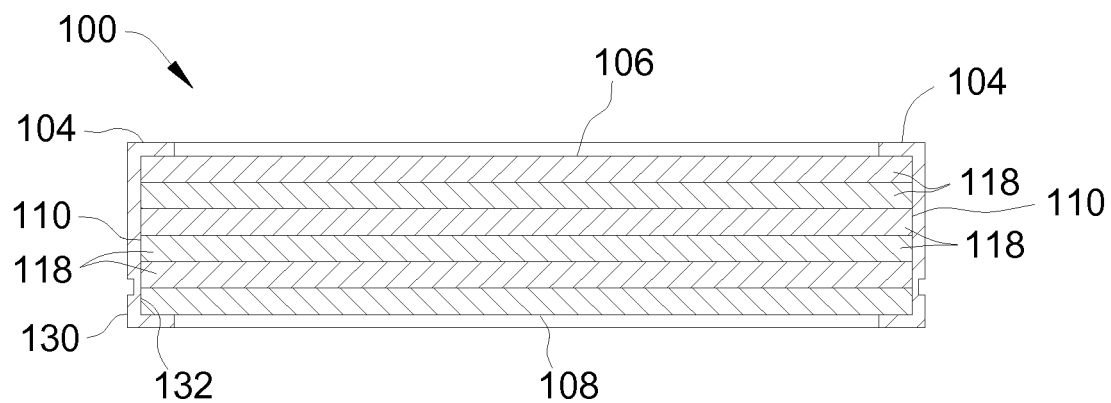
FIG. 2 is a cross-sectional view of the PV module shown in FIG. 1 taken along the line A-A.

Referring initially to FIGS. 1 and 2, a PV module is indicated generally at 100. A perspective view of the PV module 100 is shown in FIG. 1. FIG. 2 is a cross sectional view of the PV module 100 taken at line A-A shown in FIG. 1. The PV module 100 includes a solar laminate 102 (also referred to as a PV laminate) and a frame 104 circumscribing the solar laminate 102.

The solar laminate 102 includes a top surface 106 and a bottom surface 108 (shown in FIG. 2). Edges 110 extend between the top surface 106 and the bottom surface 108. In this embodiment, the solar laminate 102 is rectangular shaped. In other embodiments, the solar laminate 102 may have any suitable shape.

As shown in FIG. 2, the solar laminate 102 has a laminate structure that includes several layers 118. Layers 118 may include for example glass layers, non-reflective layers, electrical connection layers, n-type silicon layers, p-type silicon layers, and/or backing layers. In other embodiments, solar laminate 102 may have more or fewer layers 118, including only one layer, or may have different layers 118, and/or may have different types of layers 118. The solar laminate 102 includes a plurality of solar cells (not shown), each of which converts solar energy to electrical energy. The outputs of the solar cells are connected in series and/or parallel to produce the desired output voltage and current for the solar laminate 102.

As shown in FIG. 1, the frame 104 circumscribes the solar laminate 102. The frame 104 is coupled to the solar laminate 102, as best seen in FIG. 2. The frame 104 assists in protecting the edges 110 of the solar laminate 102. In this embodiment, the frame 104 is constructed of four frame members 120. In other embodiments the frame 104 may include more or fewer frame members 120.

This frame 104 includes an outer surface 130 spaced apart from solar laminate 102 and an inner surface 132 adjacent solar laminate 102. The outer surface 130 is spaced apart from and substantially parallel to the inner surface 132. In this embodiment, the frame 104 is made of aluminum. More particularly, in some embodiments the frame 104 is made of 6000 series anodized aluminum. In other embodiments, the frame 104 may be made of any other suitable material providing sufficient rigidity including, for example, rolled or stamped stainless steel, plastic, or carbon fiber.

Figure 3:
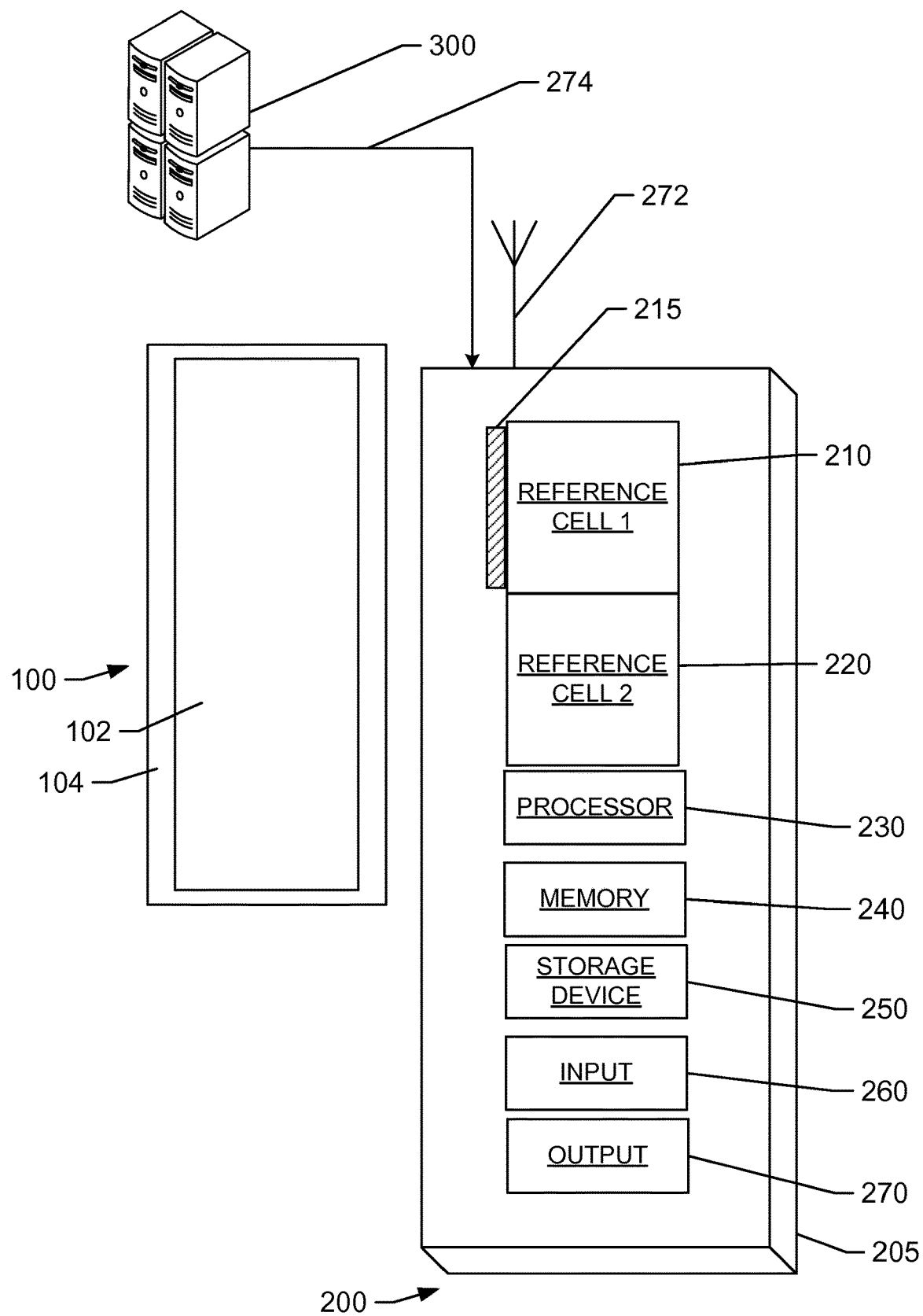
FIG. 3 is a lateral view of a soiling sensor used to measure soiling levels and soiling rates in the same location as the PV module shown in FIGS. 1 and 2.

Referring to FIG. 3, a soiling sensor 200 is indicated. As illustrated in FIG. 3, in an example embodiment, soiling sensor 200 is in plane with PV module 100. Accordingly, soiling sensor 200 receives substantially the same solar energy as PV module 100 and is exposed to substantially the same soiling conditions as PV module 100.

In the example embodiment, the soiling sensor 200 is used to determine projected or estimated soiling levels and soiling rates for PV module 100. Soiling sensor 200 includes at least two reference solar cells 210 and 220 that are mounted together within a PV module frame 205. Reference cells 210 and 220 are used together in a control and variable model. First reference cell 210, the control cell, is scheduled to be cleaned at a particular regular interval and is therefore substantially clean at any point in time. (As explained below, the frequency of cleaning is determined by the desired accuracy of the soiling rate because some amount of soiling may occur between each cleaning event.) Such cleaning may be accomplished through an automatic cleaning system or manual cleaning. In the example embodiment, an automatic cleaning system 215 is used. Automatic cleaning system 215 may include a cleaning arm, a cleaning apparatus, a mechanical wipe, a spray, or a combination thereof. Second reference cell 220, the variable sensor, is not cleaned. As a result, at any point in time the difference in soiling between first 210 and second reference cell 220 indicates the amount of soiling that has taken place since second reference cell 220 (the variable sensor) was last cleaned (i.e., since soiling monitoring began) excepting any intervening soiling that has occurred since the last cleaning of first reference cell 210.

First and second reference cells 210 and 220 are constructed and designed in a substantially similar manner and made of substantially the same materials. Further, first and second reference cells 210 and 220 are in the same plane-of-array. Because soiling sensor 200 is designed to identify soiling rates for PV module 100, both reference cells 210 and 220 are also in the same plane-of-array as PV module 100.

In at least some examples, soiling sensor 200 also includes standard components of computing devices including a processor 230, a memory 240, a storage device 250, an input 260, and an output 270. Input 260 and output 270 may be configured to provide wired or wireless connectivity to other systems using, for example, wireless antenna 272 or wired connection 274. In other examples, soiling sensor 200 is in communication with an associated computing device such as soiling monitoring computer system 300. In such examples, soiling sensor 200 may communicate with associated computing device 300 via wired 274 or wireless protocols 272. Associated computing device 300 may further communicate with soiling monitoring computer system 300.

In some examples, soiling sensor 200 is a self-contained unit that may be capable of communicating with any hardware or equipment using known wired or wireless communications protocols. In the example embodiment, soiling sensor 200 is in wireless communication with soiling monitoring computer system 300. Accordingly, soiling sensor 200 may send and receive information.

To determine the relative difference in output of the first and second reference cells 210 and 220, the energy production of each reference cell 210 and 220 is measured as an energy production level (e.g., the numeric value of the current produced by each reference cell.) In one example wherein soiling sensor 200 includes networked computing devices, soiling sensor 200 determines the energy production level for each reference cell and transmits such values to soiling monitoring computer system 300 using any suitable networking protocol. In a second example, soiling sensor 200 does not directly determine energy production levels but rather sends the outputted energy for each reference cell 210 and 220 to an external system that determines the energy production level for each reference cell 210 and 220 and uses such energy production levels to determine an energy production differential. The external system may be soiling monitoring computer system 300 or a system in communication with soiling monitoring computer system 300.

In all such embodiments, soiling monitoring computer system 300 receives the energy production level for each reference cell 210 and 220 and determines the impact of soiling by comparing the energy production levels. More specifically, the difference between the energy production levels for first and second reference cells 210 and 220 is the impact of soiling. Soiling monitoring computer system 300 may further derive the soiling rate based on the determined impact of soiling. Generally, the number of photons received by each reference cell 210 and 220 is linearly related to the amount of current produced by each reference cell 210 and 220. Therefore, the energy production level is a useful proxy for the energy output associated with each reference cell 210 and 220. Accordingly, the ratio of the energy production levels for each reference cell 210 and 220 may be used to determine the percentage of energy production lost by the second reference cell 220 to soiling. The impact of soiling on the energy production level of second reference cell 220 may be described in Equation 1, below:

$$1 - \left(\frac{E2}{E1}\right) = \% \text{ Energy Loss} \qquad \text{Equation 1}$$

The soiling rate is simply determined by dividing the impact of soiling by the amount of time that has passed since the actual beginning of the soiling period. In such examples, the soiling rate is necessarily linear. In other examples, the soiling rate may be determined as a more complex equation because the soiling rate varies over the period. Accordingly, in alternative examples, the impact of soiling may be determined for several points in time and a suitable method of regression may be determined to define an equation that describes the experienced soiling.

As described above, in some examples the automatic cleaning system 215 of first reference cell 210 may be programmed to clean first reference cell 210 at a particular interval of time. In other examples, the automatic cleaning system 215 of first reference cell 210 may be programmed to clean first reference cell 210 after the measured impact of soiling reaches a minimum threshold. In other words, automatic cleaning system 215 may be programmed to act when soiling on first reference cell 210 reaches a minimum threshold level. Such a minimum threshold level may be useful to prevent unnecessary excessive cleaning of first reference cell 210 when negligible amounts of soiling are on first reference cell 210. Because soiling sensor 200 may be in communication with soiling monitoring computer system 300, soiling sensor 200 may also be reprogrammed to adjust the scheduling of the cleaning of first reference cell 210 or to adjust the minimum threshold. Due to the potential costs of cleaning first reference cell 210, the use of such controls and minimum thresholds may reduce costs and reduce wear on automatic cleaning system 215. Further, soiling monitoring computer system 300 may send a signal to soiling sensor 200 to cause the automatic cleaning system 215 to clean first reference cell 210 "on demand" or at a particular scheduled point in time.

In an alternative embodiment, soiling monitoring computer system 300 may generate alerts indicating that the benefits of cleaning PV system 100 are presently greater than the costs of cleaning. More specifically, soiling monitoring computer system 300 monitors the total level of soiling based on the determined impact of soiling. The total level of soiling may be monitored using either the primary example of soiling sensor 200

In such examples, as the intensity of the impact of soiling increases, the warning or alert may be sent indicating that PV system 100 should be cleaned immediately. In examples where soiling sensor 200 is used, soiling sensor 200 may also be cleaned at the same time and the alert may indicate a command to do so.

In additional examples, as the intensity of the impact of soiling increases, a more intense or severe warning signal may also be sent. Depending upon the intensity or severity of the warning signal, scheduling of the cleaning of PV system 100 may further be determined. For example, the warning signal may be a numeric value between 0 and 10. As the warning signal rises from 4 to 8, a maintenance crew may understand that PV system 100 would be benefited by cleaning. Further, varying intensity or severity of the warning signal allows maintenance crews to prioritize the cleaning between multiple PV systems 100. In further examples, soiling sensor 200 may be integrated with a monitoring gateway device. The monitoring gateway device may be configured to transmit the warning signal to operations and maintenance teams.

In at least some examples, soiling sensor 200 may be configured to send alerts or warnings only after a minimum irradiance level is reached. During a typical day, soiling sensor 200 may experience a wide variety of irradiance levels. Accordingly, soiling sensor 200 may be configured to only send alerts or warnings because the "noise" of the signals received by soiling sensor 200 is too high at irradiance levels below the minimum. In some examples, the minimum irradiance level may be pre-determined while in other examples the minimum irradiance level may be set by soiling monitoring computer system 300 which transmits the minimum irradiance level to soiling sensor 200. In at least some examples, the irradiance level may be detected by a pyranometer included within soiling sensor 200. In such examples, the pyranometer is in communication with soiling sensor 200 and capable of providing information to soiling sensor 200 and to soiling monitoring computer system 300. In other examples, the irradiance level may be detected by an outside service such as an external pyranometer. In such examples, the outside service may communicate to soiling sensor 200 using known wired or wireless communications protocols. In some examples, soiling sensor 200 may also be configured to adjust alert levels depending on meteorological forecasts. In such examples, soiling sensor may receive (directly or via the soiling monitoring computer system) meteorological forecast data from an external service (not shown). Such meteorological forecast data may include precipitation forecasts. Because rain may be effective in reducing soiling, in such examples, the alert levels may be reduced.

Further, during low light periods (e.g., from sunset to sunrise), soiling sensor 200 may not change reporting or alert status. In some examples, soiling sensor 200 may be specifically programmed to not report or alert during these periods because they are known to be associated with low irradiance levels. Alternately, daily values for irradiance levels may be aggregated when observation values exceed a minimum irradiance level (more than 500 W/m$^2$ in the example embodiment) and used to calculate a daily soiling estimate. The daily soiling estimate may further be used for warnings and alerts. Because soiling typically grows at slow rates, such a daily soiling estimate will identify soiling activity in a timely manner. In some examples, soiling sensor 200 may be configured to include astronomical equations to determine the actual relative position of the sun at the location of the soiling sensor. As a result, soiling sensor 200 may also calculate the time of sunrise and sunset to determine when to stop monitoring, alerting, and reporting between sunset and sunrise.

Figure 4:
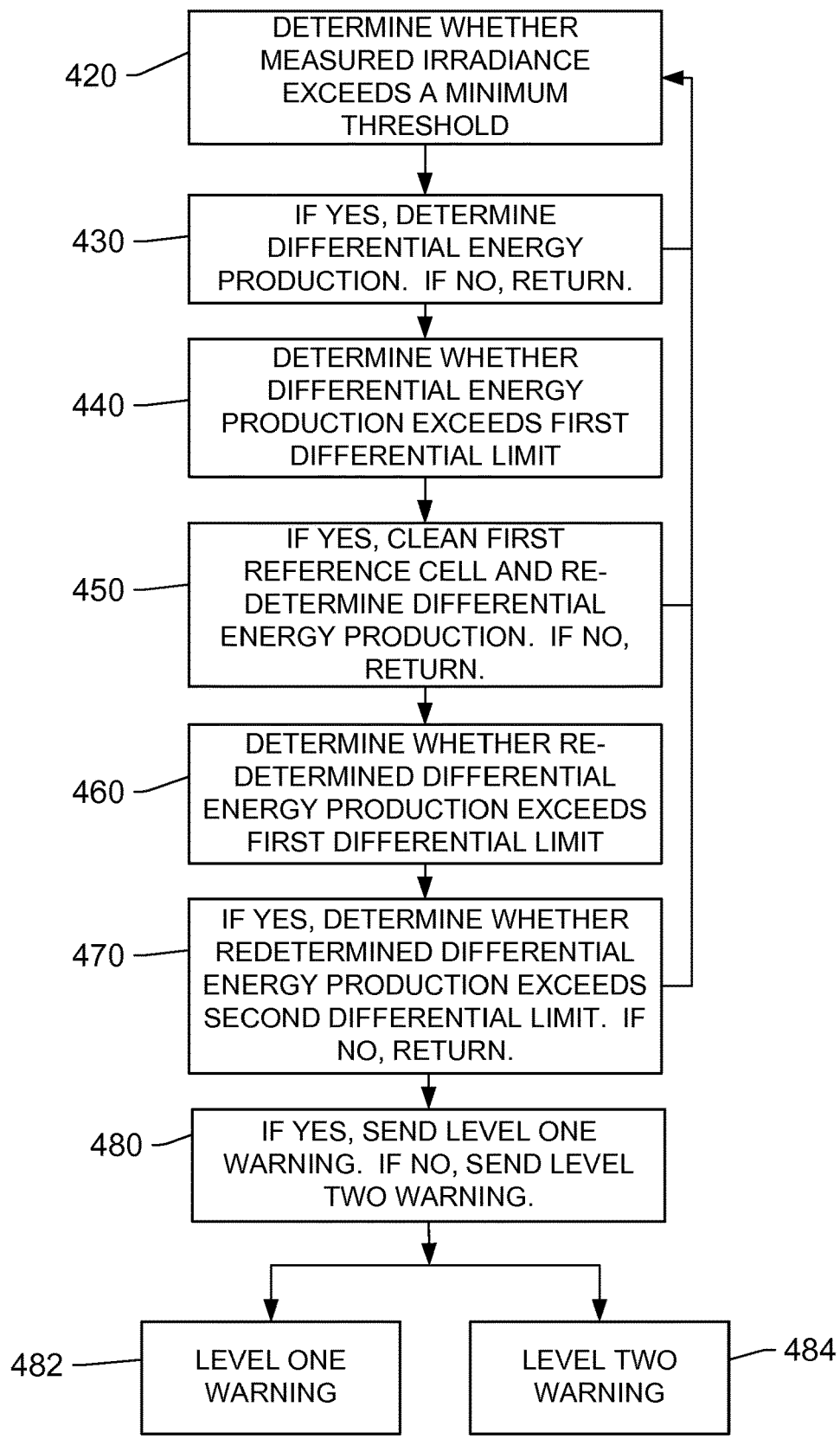
FIG. 4 is a flow chart illustrating alert generation processes executed by the soiling sensor of FIG. 3.

In some examples, soiling sensor 200 may be configured to execute processes to generate alerts. Referring to FIG. 4, process 401 illustrates an example process that may be executed by soiling sensor 200 in order to issue alerts. It is understood that although the following description refers to soiling sensor 200 executing process 401, soiling monitoring computer system 300 may also execute process 401.

Soiling sensor 200 typically determines irradiance levels. As described above and herein, soiling sensor 200 may be configured to not report alerts when minimum irradiance levels are not exceeded. As shown in step 420, soiling sensor 200 therefore determines whether irradiance levels exceed a minimum threshold. Minimum threshold (or minimum irradiance level threshold) may be provided by a user using soiling sensor 200, a user using soiling monitoring computer system 300, stored in memory of either soiling sensor 200 or soiling monitoring computer system 300, or dynamically retrieved from external systems. As indicated in step 430, if such a threshold is exceeded, soiling sensor 200 determines a differential energy production (i.e., the difference in energy produced by first reference cell 210 and second reference cell 220). If such a threshold is not exceeded (as indicated in step 430) soiling sensor 200 returns to the beginning of process 401 and waits until a time that the threshold is met or exceeded.

As described above, soiling sensor 200 (on its own or via soiling monitoring computer system 300) may include a plurality of limits for differential energy production. In step 440 soiling sensor 200 determines whether the differential energy production meets a first differential limit (e.g., the lowest differential limit). As indicated in step 450, if the differential energy production exceeds the first differential limit, soiling sensor 200 may clean the first reference cell 210 and recalculate or re-determine the differential energy production. This additional cleaning and recalculation may be performed to ensure the accuracy of the differential energy production calculation. If the differential energy production does not exceed the first differential limit, soiling sensor 200 returns to the beginning of the process.

As described in step 460, soiling sensor 200 may determine whether the re-determined differential energy production exceeds the first differential limit. The first differential limit may be a first minimum threshold of severity (e.g., indicating that some significant soiling has accrued on second reference cell 220). The first differential limit may be associated with an "intermediate warning" or a "yellow warning".

As described in step 470, if the re-determined differential energy production exceeds the first differential limit, soiling sensor 200 further determines whether the re-determined differential energy production exceeds a second differential limit. The second differential limit may be a second minimum threshold of severity (e.g., indicating that a critical amount of soiling has accrued on second reference cell 220). The second differential limit may be associated with a "severe warning" or a "red warning". Alternately, as described in step 470, if the differential energy production does not exceed the first differential limit, soiling sensor 200 returns to the beginning of the process.

As described in step 480, if soiling sensor 200 determines that re-determined differential energy production exceeds the second differential limit, soiling sensor 200 issues a "level one warning" 482, a "severe warning", or a "red warning". Alternately, if soiling sensor 200 determines that re-determined differential energy production does not exceed the second differential limit (and only exceeds the first differential limit), soiling sensor 200 issues a "level two warning" 484, an "intermediate warning", or a "yellow warning".

In the embodiment wherein process 401 is executed by soiling sensor 200, soiling sensor 200 may execute process 401 using processor 230 and store relevant code and instructions at memory 240 and/or storage device 250. In embodiments wherein process 401 is executed by soiling sensor 200 in conjunction with soiling monitoring computer system 300, soiling sensor 200 may use input 260 and output 270 to exchange data with soiling monitoring computer system 300.

Figure 5:
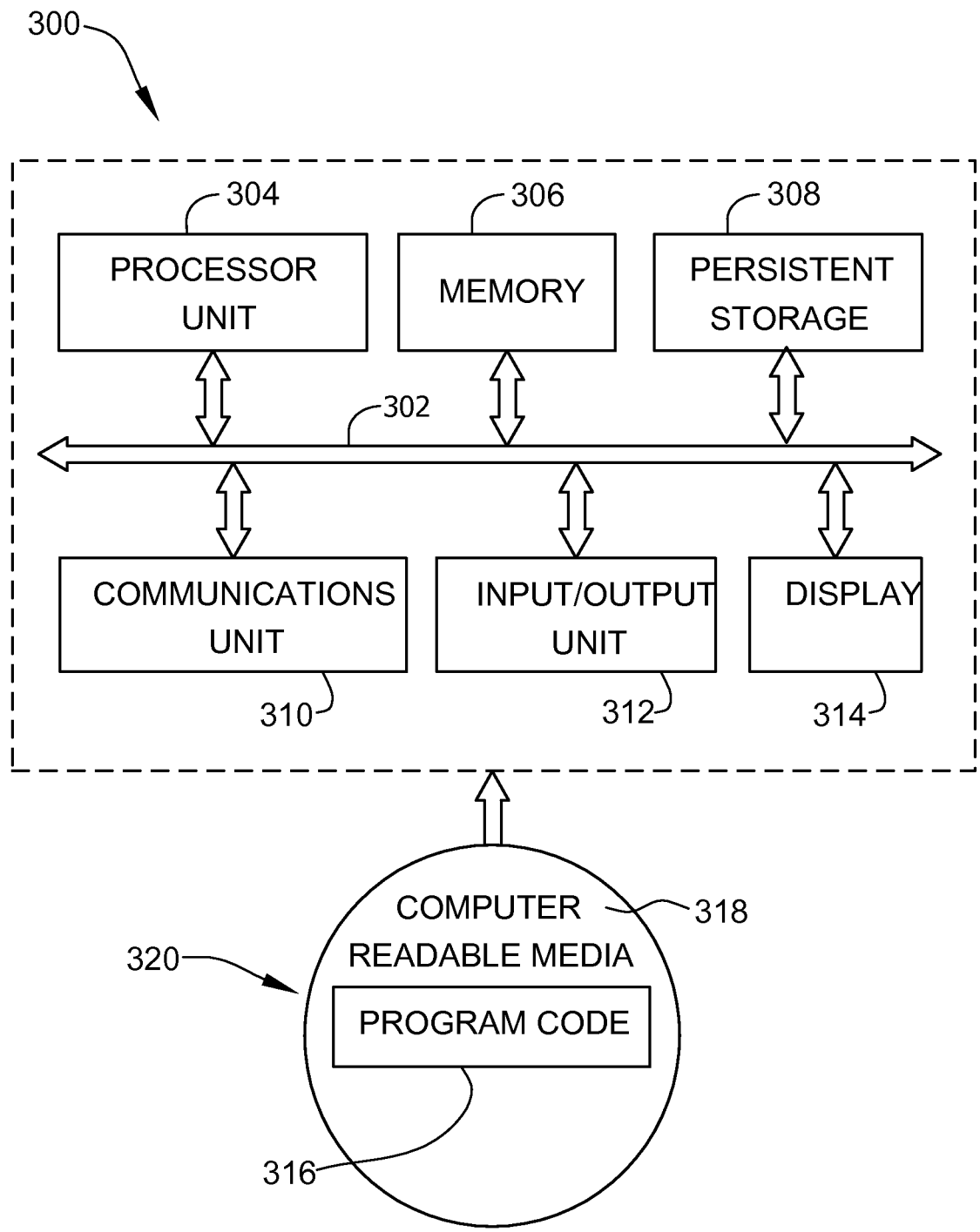
FIG. 5 is a block diagram of an example computing device.

Some example methods and systems are performed using and/or include computing devices. FIG. 5 is a block diagram of an example computing device 300. More specifically, computing device 300 represents an example embodiment of a soiling monitoring computer system. In the example implementation, computing device 300 includes communications fabric 302 that provides communications between a processor unit 304, a memory 306, persistent storage 308, a communications unit 310, an input/output (I/O) unit 312, and a presentation interface, such as a display 314. In addition to, or in alternative to, the presentation interface may include an audio device (not shown) and/or any device capable of conveying information to a user.

Processor unit 304 executes instructions for software that may be loaded into a storage device (e.g., memory 306). Processor unit 304 may be a set of one or more processors or may include multiple processor cores, depending on the particular implementation. Further, processor unit 304 may be implemented using one or more heterogeneous processor systems in which a main processor is present with secondary processors on a single chip. In another implementation, processor unit 304 may be a homogeneous processor system containing multiple processors of the same type.

Memory 306 and persistent storage 308 are examples of storage devices. As used herein, a storage device is any tangible piece of hardware that is capable of storing information either on a temporary basis and/or a permanent basis. Memory 306 may be, for example, without limitation, random access memory (RAM) such as dynamic RAM (DRAM) or static RAM (SRAM), read-only memory (ROM), erasable programmable read-only memory (EPROM), electrically erasable programmable read-only memory (EEPROM), non-volatile RAM (NVRAM), and/or any other suitable volatile or non-volatile storage device. Persistent storage 308 may take various forms depending on the particular implementation, and persistent storage 308 may contain one or more components or devices. For example, persistent storage 308 may be one or more hard drives, flash memory, rewritable optical disks, rewritable magnetic tapes, and/or some combination of the above. The media used by persistent storage 308 also may be removable. For example, without limitation, a removable hard drive may be used for persistent storage 308.

A storage device, such as memory 306 and/or persistent storage 308, may be configured to store data for use with the processes described herein. For example, a storage device may store (e.g., have embodied thereon) computer-executable instructions, executable software components, PV system component data, PV system layouts, installation instructions, work orders, and/or any other information suitable for use with the methods described herein. When executed by a processor (e.g., processor unit 304), such computer-executable instructions and/or components cause the processor to perform one or more of the operations described herein.

Communications unit 310, in these examples, provides for communications with other computing devices or systems. In the example implementation, communications unit 310 is a network interface card. Communications unit 310 may provide communications through the use of either or both physical and wireless communication links. Communication unit 310 provides communication to one or more element of the PV system.

Input/output unit 312 enables input and output of data with other devices that may be connected to computing device 300. For example, without limitation, input/output unit 312 may provide a connection for user input through a user input device, such as a keyboard and/or a mouse. Further, input/output unit 312 may send output to a printer. Display 314 provides a mechanism to display information, such as any information described herein, to a user. For example, a presentation interface such as display 314 may display a graphical user interface, such as those described herein. The communication device 310 may include one or more analog I/O.

Instructions for the operating system and applications or programs are located on persistent storage 308. These instructions may be loaded into memory 306 for execution by processor unit 304. The processes of the different implementations may be performed by processor unit 304 using computer implemented instructions and/or computer-executable instructions, which may be located in a memory, such as memory 306. These instructions are referred to herein as program code (e.g., object code and/or source code) that may be read and executed by a processor in processor unit 304. The program code in the different implementations may be embodied in a non-transitory form on different physical or tangible computer-readable media, such as memory 306 or persistent storage 308.

Program code 316 is located in a functional form on non-transitory computer-readable media 318 that is selectively removable and may be loaded onto or transferred to computing device 300 for execution by processor unit 304. Program code 316 and computer-readable media 318 form computer program product 320 in these examples. In one example, computer-readable media 318 may be in a tangible form, such as, for example, an optical or magnetic disc that is inserted or placed into a drive or other device that is part of persistent storage 308 for transfer onto a storage device, such as a hard drive that is part of persistent storage 308. In a tangible form, computer-readable media 318 also may take the form of a persistent storage, such as a hard drive, a thumb drive, or a flash memory that is connected to computing device 300. The tangible form of computer-readable media 318 is also referred to as computer recordable storage media. In some instances, computer-readable media 318 may not be removable.

Alternatively, program code 316 may be transferred to computing device 300 from computer-readable media 318 through a communications link to communications unit 310 and/or through a connection to input/output unit 312. The communications link and/or the connection may be physical or wireless in the illustrative examples. The computer-readable media also may take the form of non-tangible media, such as communications links or wireless transmissions containing the program code.

In some illustrative implementations, program code 316 may be downloaded over a network to persistent storage 308 from another computing device or computer system for use within computing device 300. For instance, program code stored in a computer-readable storage medium in a server computing device may be downloaded over a network from the server to computing device 300. The computing device providing program code 316 may be a server computer, a workstation, a client computer, or some other device capable of storing and transmitting program code 316.

Program code 316 may be organized into computer-executable components that are functionally related. Each component may include computer-executable instructions that, when executed by processor unit 304, cause processor unit 304 to perform one or more of the operations described herein.

The different components illustrated herein for computing device 300 are not meant to provide architectural limitations to the manner in which different implementations may be implemented. The different illustrative implementations may be implemented in a computer system including components in addition to or in place of those illustrated for computing device 300. For example, in some embodiments, computing device includes a global positioning system (GPS) receiver. Moreover, components shown in FIG. 3 can be varied from the illustrative examples shown. As one example, a storage device in computing device 300 is any hardware apparatus that may store data. Memory 306, persistent storage 308 and computer-readable media 318 are examples of storage devices in a tangible form.

In another example, a bus system may be used to implement communications fabric 302 and may include one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, without limitation, memory 306 or a cache such as that found in an interface and memory controller hub that may be present in communications fabric 302.

Figure 6:
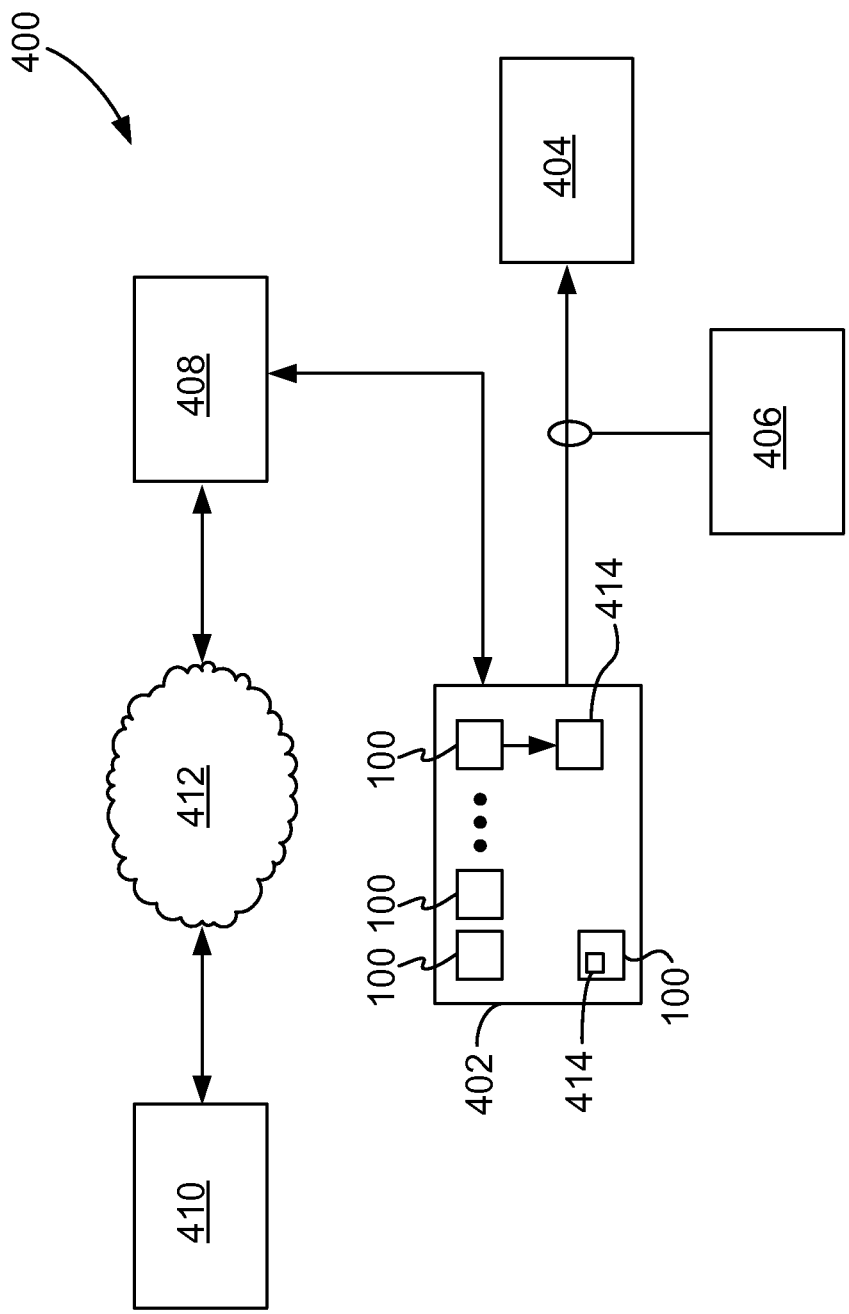
FIG. 6 is a block diagram of an example PV system.

FIG. 6 is a block diagram of an example PV system 400. The PV system 400 includes an array 402 of PV modules 100 and one or more inverters. The array 402 outputs AC power to one or more loads 404. A meter 406 measures the power delivered to the loads 404. A gateway device 408, also referred to as a data acquisition device, a data logger, or a data acquisition system (DAS), monitors the array 402 and transmits data collected from the array 402 to a backend system 410 via a network 412. Backend system 410 includes one or more computing devices 300. Backend system 410 is usually located at a second location physically separated from the first location at which PV system 400 is located. Alternatively, the second system may be located at the same site as the PV system 400. Moreover, the gateway device 408 may provide information to and communicate with more than one backend systems 410. The distance between the first location and the second location will vary among installed PV systems 400. In some embodiments, the first location and the second location are greater than five miles apart. In other embodiments, the first and second locations are more than ten miles apart, 25 miles apart, 50 miles apart, 100 miles apart, 200 miles apart, or even located on different continents.

The array 402 may be any suitable array of PV modules 100 and one or more inverters 414. For example, the array 402 may include a plurality of PV modules arranged in strings of PV modules. Each string of modules is connected to a single inverter to convert the DC output of the string of PV modules to an AC output. Alternatively, or additionally, each PV module may be coupled to its own inverter 414 (sometimes referred to as a microinverter) positioned near or on the PV module to which it is electrically coupled. In still other examples, a plurality of strings of PV modules may be connected, directly or through one or more string combiners, to a single inverter 414, sometimes referred to as a central or string inverter.

In embodiments that do not include microinverters, the array 402 may include a direct current power manager (DCPM) coupled to each PV module. The DCPM performs, for example, maximum power point tracking (MPPT) for the PV module. It may also selectively control (i.e., limit and/or increase) the maximum power output of the PV module and/or control the conduction of bypass diodes based on temperature and bypass current. The DCPM may also translate the output I-V curve of the PV module to a new I-V curve at which the output voltage does not vary with ambient temperature.

In some embodiments, the array 402 includes one or more tracking devices configured to selectively position the PV modules relative to the sun to attempt to maximize the solar energy incident on the PV modules over time. Any other suitable arrangement of PV modules and inverter(s) may be used, including combinations of the arrangements described above.

The gateway device 408 collects data concerning array 402, such as via one or more sensors (not shown). The gateway device 408 is and/or includes a computing device, such as computing device 300. The collected data may include any appropriate operational, situational, environmental, or other data related to the operation and/or condition of the array 402. For example, the gateway may monitor the ambient air temperature around the array 402, the amount of sunlight incident on the array 402 (or one or more PV module), the output voltage and current of the array 402, the output voltage and current of each PV module, the output voltage and current of each inverter and/or microinverter 414, the surface temperature of the PV modules 100, etc. Moreover, in some embodiments, the gateway device 408 is in communication with one or more components of the array 402. For example, the gateway device 408 may be in communication with one or more inverters 414 in the array 402. Each inverter 414 may provide the gateway device 408 with, for example, its input voltage, its input current, its output voltage, its output current, etc. In some embodiments, the array 402 (and more particularly the inverters 414) may be controlled via the gateway device 408.

In one example, the network 412 is the Internet. In other implementations, network 412 is any other suitable communication network, including, for example, a wide area network (WAN), a local area network (LAN), a cellular network, etc. Network 412 may include more than one network. For example, gateway device 408 may connect to the Internet through one or more other networks and/or interfaces, such as a local area network (LAN), a wide area network (WAN), a home area network (HAN), dial-in-connections, cable modems, and high-speed ISDN lines.

Figure 7:
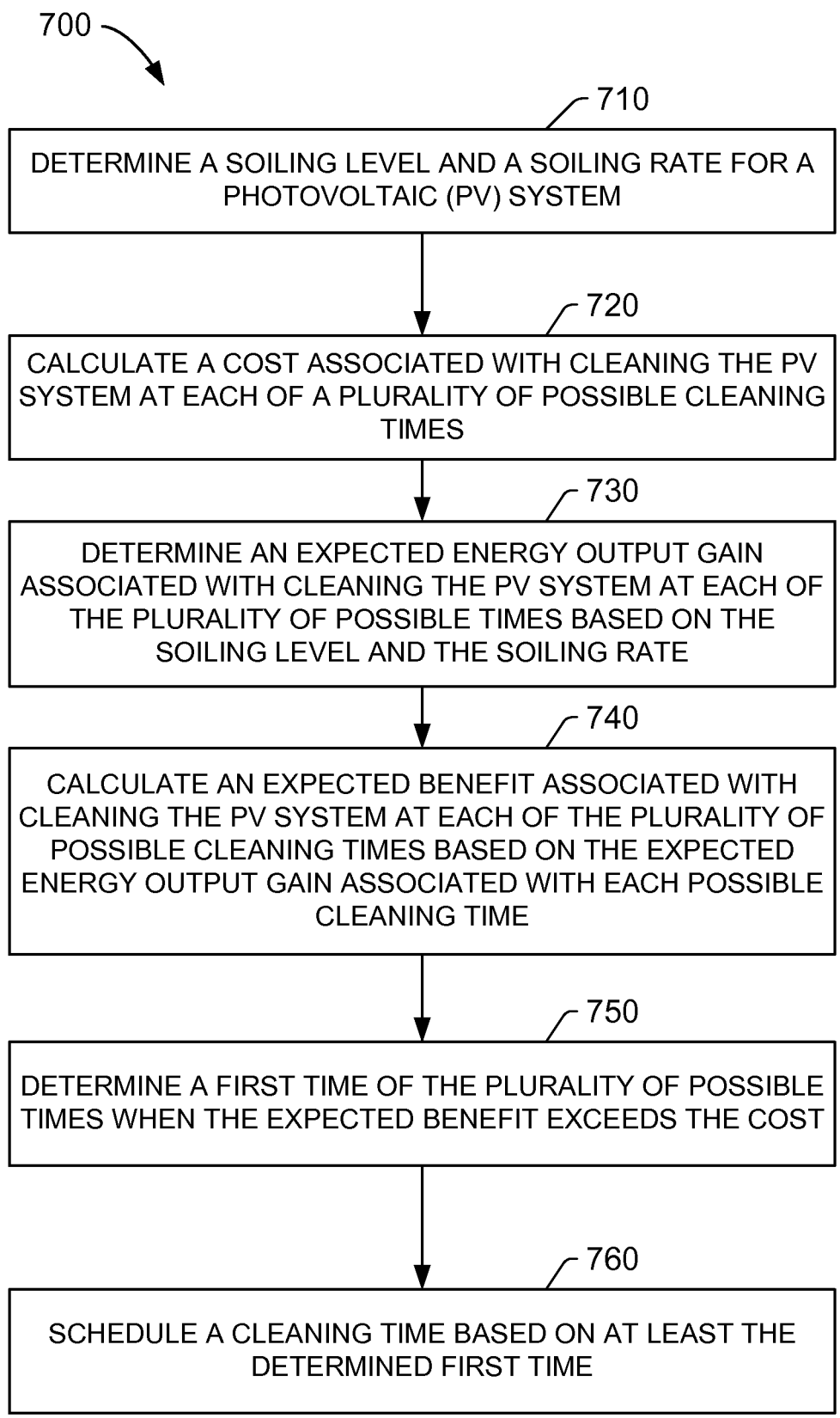
FIG. 7 is a flow diagram of an example method for scheduling a cleaning of the PV module shown in FIGS. 1 and 2.

Referring to FIG. 7, method 700 shows an example method of scheduling cleaning of a photovoltaic ("PV") system 100 implemented by a soiling monitoring computer system 300. Soiling monitoring computer system 300 is configured to determine 710 a soiling rate for a photovoltaic ("PV") system 100. As described herein, in an example embodiment, soiling monitoring computer system 300 determines a soiling rate and a soiling level by using a soiling sensor 200. Alternately, the soiling rate and soiling level is determined by soiling monitoring computer system 300 without using a soiling sensor 200 (e.g., because it is unavailable or otherwise not accessible). Alternatively, soiling monitoring computer system 300 uses system measurements from PV system 100 and an irradiance sensor (configured to determine an on-site irradiance measurement) such as a pyranometer or a reference cell (not shown). In most examples, the irradiance sensor is not cleaned manually or automatically and is therefore exposed to soiling. Therefore, both the irradiance sensor and PV system 100 will accumulate soiling. More specifically, the irradiance sensor will record a lower irradiance measurement than the actual irradiance measurement due to soiling effects and PV system 100 will produce a lower energy production output than would otherwise be produced without soiling. Generally, PV systems 100 experience soiling at a higher rate than irradiance sensors that are exposed to the same conditions. As a result of this discrepancy in soiling rates, the impact of soiling on PV system 100 can be partially determined based on the uncleaned irradiance sensor. However, such a determined impact will necessarily underestimate the impact of soiling on PV system 100 because the reference value (i.e., irradiance measurements of the uncleaned irradiance sensor) is affected by soiling. In order to compensate for such an underestimation, the soiling monitoring computer system also utilizes a clear sky model that determines an estimate of soiling on the irradiance sensor. Restated, the soiling monitoring computer system first calculates the relative impact of soiling on PV system 100 as compared to the uncleaned irradiance sensor and adjusts that relative impact of soiling based on the clear sky model. In one example, the soiling monitoring computer system determines that PV system 100 is producing an energy output that is X% lower than expected based on the measured irradiance as measured by the uncleaned irradiance sensor. The clear sky model further indicates that the irradiance sensor has been exposed to soiling and is receiving irradiance measurements Y% lower than normal. In one example, the total impact of soiling on PV system 100 may be determined to be X%+Y%.

Soiling monitoring computer system 300 is also configured to calculate 720 a cost associated with cleaning PV system 100 at each of a plurality of possible cleaning times. Specifically, soiling monitoring computer system 300 determines costs for cleaning PV system 100 at each available future period based on enterprise level business data. Such enterprise level business data may be retrieved from memory of the soiling monitoring computer system 300 (e.g., at memory 306 or persistent storage 308), attached storage, or an external device in communication with soiling monitoring computer system 300. The plurality of costs may include material costs, labor costs, fuel costs, and any other suitable category of costs related to the cleaning of PV systems 100.

Soiling monitoring computer system 300 is further configured to determine 730 an expected energy output gain associated with cleaning the PV system at each of the plurality of possible times based on the soiling level and the soiling rate. Energy output gains assume that soiling level is reduced to nearly zero. Energy output gains therefore reflect the difference between energy output at a given time with soiling and energy output at a given time without soiling (assuming that it is removed by cleaning). In one example embodiment, soiling monitoring computer system 300 determines a soiling level for each of a plurality of future time periods using the soiling level (at a present time) and the soiling rate. The soiling level at time period t ($sl_t$) is described in Equation 2, below, wherein soiling rate sr is a function of time, and the present soiling level is $sl_p$:

$$sl_t = sr(t) + sl_p \qquad \text{Equation 2}$$

Soiling monitoring computer system 300 also receives a projected energy output for PV system 100 for each of the plurality of future time periods. The projected energy output may be determined based on forecasted irradiance data, historical meteorological data, and historical energy output for PV system 100. The plurality of future soiling rates (using the soiling sensor or using the alternative method of a irradiance sensor) are used to adjust projected energy output for PV system 100 and therefore to determine the expected energy output gain in future periods.

Soiling monitoring computer system 300 is also configured to calculate 740 an expected benefit associated with cleaning the PV system at each of the plurality of possible cleaning times based on the expected energy output gain associated with each possible cleaning time. Specifically, soiling monitoring computer system 300 determines financial benefits of cleaning the system at each available future period based on enterprise level business data stored at memory 306 or 308 of soiling monitoring computer system 300, attached storage, or an external device in communication with soiling monitoring computer system 300. The business data may include, for example, estimated energy production, the economic value of energy, and the costs associated with cleaning PV system 100 at each of the plurality of possible cleaning times. The estimated energy production data represents the estimated energy production for PV system 100 assuming that it was not soiled (or that it was cleaned). The value of energy may be determined based on market analysis systems and databases and may include a value that reflects purchase power agreement (PPA) payments, energy credits, and energy incentives. The cost of cleaning may incorporate labor and material costs to cleaning.

Soiling monitoring computer system 300 may compare the expected energy output gain of PV system 100 to such business data to estimate an economic impact or expected benefit of cleaning PV system 100 at each of the plurality of possible cleaning times. The expected benefit may be expressed alternatively as the economic impact of the energy output lost based on the soiling impact for each of the plurality of possible cleaning times.

Soiling monitoring computer system 300 is further configured to determine 750 a first time of the plurality of possible times when the expected benefit exceeds the cost. In other words, soiling monitoring computer system 300 identifies the first time at which it is economically efficient to clean PV system 100. Accordingly, soiling monitoring computer system 300 schedules a cleaning time based on at least the determined first time and is configured to schedule 760 a cleaning time based on at least the determined first time. In other words, soiling monitoring computer system 300 creates a schedule for cleaning PV system 100 such that the first time is identified as the first day that a cleaning or maintenance crew should clean PV system 100. For a variety of reasons, soiling monitoring computer system 300 creates the schedule as a window such that each successive time period is an option for cleaning PV system 100. In such examples, the window may terminate when the soiling period ends and precipitation naturally cleans PV system 100.

Figure 8:
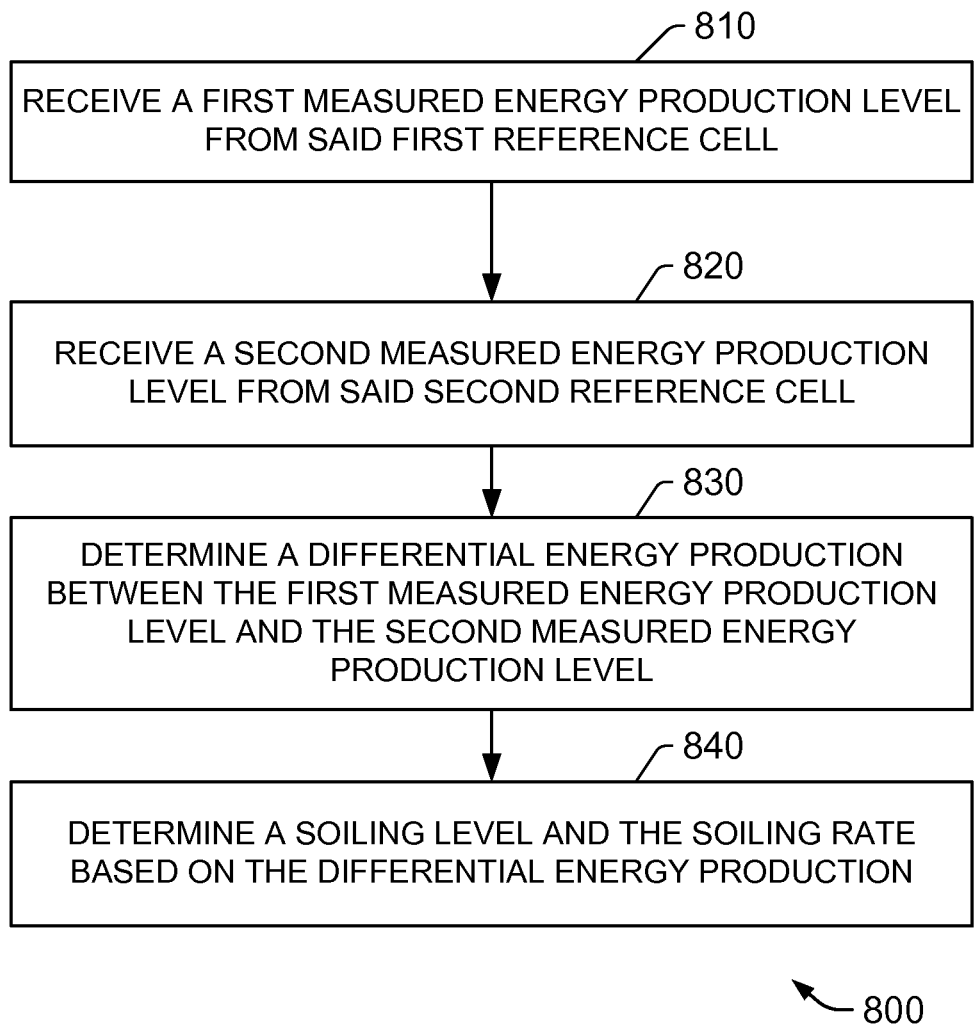
FIG. 8 is a flow diagram determining a soiling rate and a soiling level for the PV module shown in FIGS. 1 and 2.

Referring to FIG. 8, method 800 shows an example method of determining a soiling rate and a soiling level using, for example, soiling sensor 200. In the example embodiment, method 800 is implemented by soiling sensor 200. In other embodiments, soiling monitoring computer system 300 may use alternative methods to determine soiling rates and soiling levels.

Soiling sensor 200 is configured to receive 810 a first measured energy production level from a first reference cell. Receiving 810 represents soiling sensor 200 receiving energy at first reference cell 210 and determining an associated energy production level using internal resources (such as processor 230) or external resources (such as soiling monitoring computer system 300). Soiling sensor 200 is also configured to receive 820 a second measured energy production level from a second reference cell. Receiving 820 represents soiling sensor 200 receiving energy at second reference cell 220 and determining an associated energy production level using internal resources (such as processor 230) or external resources (such as soiling monitoring computer system 300).

Soiling sensor 200 is further configured to determine 830 a differential energy production between the first measured energy production level and the second measured energy production level. Determining 830 represents soiling sensor 200 determining a difference between the received first measured energy production level and the second measured energy production level.

Soiling sensor 200 is also configured to determine 840 a soiling level and the soiling rate based on the differential energy production. Determining 840 represents soiling sensor 200 (using internal resources such as processor 230 or using external resources such as soiling monitoring computer system 300) receiving the energy production level for each reference cell 210 and 220 and determining the soiling level by comparing the energy production levels. More specifically, the difference between the energy production levels for the first and second reference cells is the soiling level. Soiling sensor 200 also derives the soiling rate based on the determined impact of soiling. Generally, the number of photons received by each reference cell is linearly related to the amount of current produced by each reference cell 210 and 220. Therefore, the energy production level is a useful proxy for the energy output associated with each reference cell. Accordingly, the ratio of the energy production levels for each reference cell 210 and 220 may be used to determine the percentage of energy production lost by second reference cell 220 to soiling. The impact of soiling on the energy production level of second reference cell 220 may be described in Equation 1, below:

$$1 - \left(\frac{E2}{E1}\right) = \% \text{ Energy Loss} \qquad \text{Equation 1}$$

The soiling rate is simply determined by dividing the impact of soiling by the amount of time that has passed since the actual beginning of the soiling period. Processor 230 may be configured to track the time in calculations made by soiling sensor 200. For example, processor 230 may track intervals of time since the last time that reference cells 210 and/or 220 were cleaned. In such examples, the soiling rate is necessarily linear. In other examples, the soiling rate may be determined as a more complex equation because the soiling rate varies over the period. Accordingly, in alternative examples, the impact of soiling may be determined for several points in time and a suitable method of regression may be determined to define an equation that describes the experienced soiling.

Figure 9:
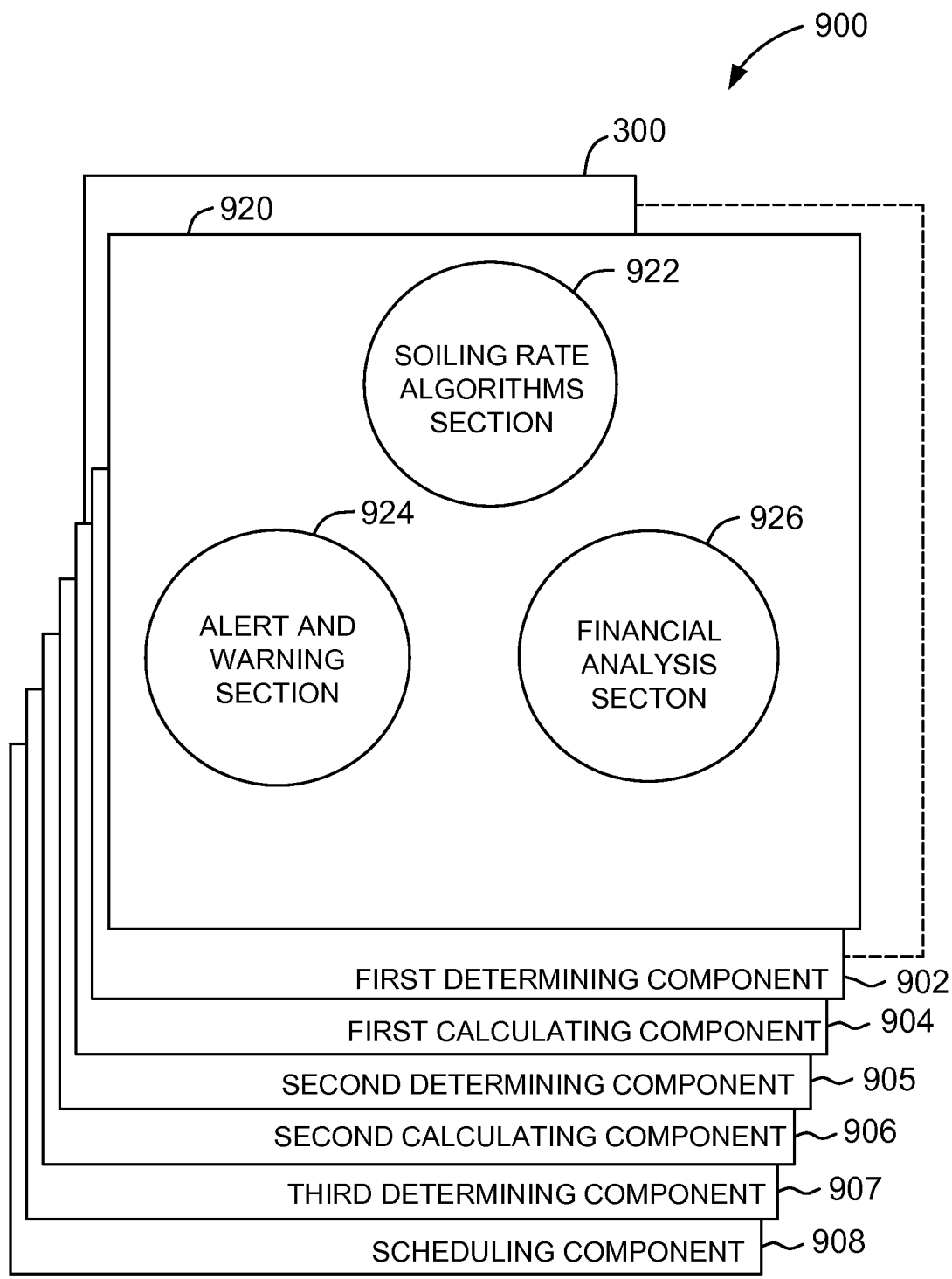
FIG. 9 is a diagram of components of example computing devices such as the computing device of FIG. 5.

FIG. 9 is a diagram of components of example computing devices such as soiling monitoring computer system 300 (shown in FIG. 5). FIG. 9 further shows a configuration of databases including at least database 920. Database 920 is coupled to several separate components within soiling monitoring computer system 300, which perform specific tasks. In an example embodiment, database 920 may be stored at storage 308 or may alternately be accessible to soiling monitoring computer system 300.

Soiling monitoring computer system 300 includes a first determining component 902 for determining a soiling rate for a photovoltaic ("PV") system 100, a first calculating component 904 for calculating a cost associated with cleaning the PV system at each of a plurality of possible cleaning times, a second determining component 905 for determining an expected energy output gain associated with cleaning the PV system at each of the plurality of possible times based on the soiling level and the soiling rate, a second calculating component 906 for calculating an expected benefit associated with cleaning the PV system at each of the plurality of possible cleaning times based on the expected energy output gain associated with each possible cleaning time, a third determining component 907 for determining a first time of the plurality of possible times when the expected benefit exceeds the cost, and a scheduling component 908 for a cleaning time based on at least the determined first time.

In an embodiment, database 920 is divided into a plurality of sections, including but not limited to, a soiling rate algorithms section 922, an alert and warning section 924, and a financial analysis section 926. These sections within database 920 are interconnected to update and retrieve the information as required.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above without departing from the scope of the invention, it is intended that all matter contained in the above description and shown in the accompanying drawings shall be interpreted as illustrative and not in a limiting sense.

What is claimed is:

1. A computer-implemented method for scheduling cleaning of a photovoltaic ("PV") system implemented by a soiling monitoring computer system in communication with a memory, the method comprising:
    determining, using a soiling sensor, a soiling level and a soiling rate for a photovoltaic (PV) system;
    calculating a cost associated with cleaning the PV system at each of a plurality of possible cleaning times;
    determining an expected energy output gain associated with the PV system when cleaned at each of the plurality of possible times based on the soiling level and the soiling rate;
    calculating an expected benefit associated with the PV system when cleaned at each of the plurality of possible cleaning times based on the expected energy output gain associated with each possible cleaning time;
    determining a first time of the plurality of possible times when the expected benefit exceeds the cost; and
    scheduling a cleaning time based on at least the determined first time.

2. The method of claim 1, wherein determining a soiling level and a soiling rate for a photovoltaic (PV) system further comprises:
    receiving historical meteorological data for a location of the PV system;
    identifying an expected last seasonal rainfall time based on the received historical meteorological data;
    identifying an expected first seasonal rainfall time based on the received historical meteorological data; and
    determining the soiling rate based on the expected last seasonal rainfall time and the expected first seasonal rainfall time.

3. The method of claim 1, wherein determining a soiling level and a soiling rate for a photovoltaic (PV) system further comprises:
    receiving a first measured energy production level from a first reference cell of the soiling sensor;
    receiving a second measured energy production level from a second reference cell of the soiling sensor;
    determining a differential energy production between the first measured energy production level and the second measured energy production level; and
    determining the soiling level and the soiling rate based on the differential energy production.

4. The method of claim 1, further comprising:
    receiving an irradiance level associated with the soiling sensor; and determining the soiling rate when the irradiance level exceeds a predefined threshold.

5. The method of claim 1, wherein determining the soiling rate further comprises:
receiving an irradiance measurement for a location of the PV system;
receiving a direct current output associated with the PV system; and
determining the soiling rate by comparing the direct current output to the irradiance measurement.

6. The method of claim 5, further comprising:
receiving a clear sky model; and
adjusting the soiling rate based on the clear sky model.

7. The method of claim 1, further comprising:
determining that a current expected benefit associated with cleaning the PV system currently exceeds a current cost associated with cleaning the PV system; and
transmitting an alert indicating that the PV system should be cleaned.

8. A soiling monitoring computer system used to schedule cleaning of a photovoltaic ("PV") system, the soiling monitoring computer system comprising:
a processor; and
a memory coupled to said processor, said processor configured to:
determine a soiling level and a soiling rate for a photovoltaic (PV) system using a soiling sensor;
calculate a cost associated with cleaning the PV system at each of a plurality of possible cleaning times;
determine an expected energy output gain associated with the PV system when cleaned at each of the plurality of possible times based on the soiling level and the soiling rate;
calculate an expected benefit associated with cleaning the PV system at each of the plurality of possible cleaning times based on the expected energy output gain associated with each possible cleaning time;
determine a first time of the plurality of possible times when the expected benefit exceeds the cost; and
schedule a cleaning time based on at least the determined first time.

9. The soiling monitoring computer system of claim 8, further configured to:
receive historical meteorological data for a location of the PV system;
identify an expected last seasonal rainfall time based on the received historical meteorological data;
identify an expected first seasonal rainfall time based on the received historical meteorological data; and
determine the soiling rate based on the expected last seasonal rainfall time and the expected first seasonal rainfall time.

10. The soiling monitoring computer system of claim 8, further configured to:
receive a first measured energy production level from a first reference cell of the soiling sensor;
receive a second measured energy production level from a second reference cell of the soiling sensor;
determine a differential energy production between the first measured energy production level and the second measured energy production level; and
determine the soiling level and the soiling rate based on the differential energy production.

11. The soiling monitoring computer system of claim 8, further configured to:
receive an irradiance level associated with the soiling sensor; and
determine the soiling rate when the irradiance level exceeds a predefined threshold.

12. The soiling monitoring computer system of claim 8, further configured to:
receive an irradiance measurement for a location of the PV system;
receive a direct current output associated with the PV system; and
determine the soiling rate by comparing the direct current output to the irradiance measurement.

13. The soiling monitoring computer system of claim 5, further configured to:
receive a clear sky model; and
adjust the soiling rate based on the clear sky model.

14. The soiling monitoring computer system of claim 8, further configured to:
determine that a current expected benefit associated with cleaning the PV system currently exceeds a current cost associated with cleaning the PV system; and
transmit an alert indicating that the PV system should be cleaned.

15. Non-transitory computer-readable storage media for scheduling cleaning of a photovoltaic ("PV") system, the computer-readable storage media having computer-executable instructions embodied thereon, wherein, when executed by at least one processor, the computer-executable instructions cause the processor to:
determine a soiling level and a soiling rate for a photovoltaic (PV) system using a soiling sensor;
calculate a cost associated with cleaning the PV system at each of a plurality of possible cleaning times;
determine an expected energy output gain associated with cleaning the PV system at each of the plurality of possible times based on the soiling level and the soiling rate;
calculate an expected benefit associated with cleaning the PV system at each of the plurality of possible cleaning times based on the expected energy output gain associated with each possible cleaning time;
determine a first time of the plurality of possible times when the expected benefit exceeds the cost; and
schedule a cleaning time based on at least the determined first time.

16. The non-transitory computer-readable storage media in accordance with claim 15, wherein the computer-executable instructions cause the processor to:
receive historical meteorological data for a location of the PV system;
identify an expected last seasonal rainfall time based on the received historical meteorological data;
identify an expected first seasonal rainfall time based on the received historical meteorological data; and
determine the soiling rate based on the expected last seasonal rainfall time and the expected first seasonal rainfall time.

17. The non-transitory computer-readable storage media in accordance with claim 15, wherein the computer-executable instructions cause the processor to:
receive a first measured energy production level from a first reference cell of the soiling sensor;
receive a second measured energy production level from a second reference cell of the soiling sensor;
determine a differential energy production between the first measured energy production level and the second measured energy production level; and
determine the soiling level and the soiling rate based on the differential energy production.

18. The non-transitory computer-readable storage media in accordance with claim 15, wherein the computer-executable instructions cause the processor to:
receive an irradiance level associated with the soiling sensor; and
determine the soiling rate when the irradiance level exceeds a predefined threshold.

19. The non-transitory computer-readable storage media in accordance with claim 15, wherein the computer-executable instructions cause the processor to:
receive an irradiance measurement for a location of the PV system;
receive a direct current output associated with the PV system; and
determine the soiling rate by comparing the direct current output to the irradiance measurement.

20. The non-transitory computer-readable storage media in accordance with claim 19, wherein the computer-executable instructions cause the processor to:
receive a clear sky model; and
adjust the soiling rate based on the clear sky model.

21. The non-transitory computer-readable storage media in accordance with claim 15, wherein the computer-executable instructions cause the processor to:
determine that a current expected benefit associated with cleaning the PV system currently exceeds a current cost associated with cleaning the PV system; and
transmit an alert indicating that the PV system should be cleaned.

22. A photovoltaic ("PV") cleaning scheduling system used to schedule cleaning of a photovoltaic ("PV") system, the PV cleaning scheduling system comprising:
a PV system;
a soiling sensor associated with said PV system configured to determine a soiling level and a soiling rate of said PV system; and
a soiling monitoring computer system in networked communication with said soiling sensor, said soiling monitoring computer system including a processor and a memory coupled to said processor, said processor configured to:
receive, from the soiling sensor, the soiling level and the soiling rate for said photovoltaic (PV) system from said soiling sensor;
calculate a cost associated with cleaning the PV system at each of a plurality of possible cleaning times;
determine an expected energy output gain associated with cleaning the PV system at each of the plurality of possible times based on the soiling level and the soiling rate;
calculate an expected benefit associated with cleaning the PV system at each of the plurality of possible cleaning times based on the expected energy output gain associated with each possible cleaning time;
determine a first time of the plurality of possible times when the expected benefit exceeds the cost; and
schedule a cleaning time based on at least the determined first time.

23. The PV cleaning scheduling system of claim 22, wherein said soiling monitoring computer system is further configured to:
receive historical meteorological data for a location of the PV system;
identify an expected last seasonal rainfall time based on the received historical meteorological data;
identify an expected first seasonal rainfall time based on the received historical meteorological data; and
determine the soiling rate based on the expected last seasonal rainfall time and the expected first seasonal rainfall time.

24. The PV cleaning scheduling system of claim 22, wherein said soiling monitoring computer system is further configured to:
receive a first measured energy production level from a first reference cell of said soiling sensor;
receive a second measured energy production level from a second reference cell of said soiling sensor;
determine a differential energy production between the first measured energy production level and the second measured energy production level; and
determine the soiling level and the soiling rate based on the differential energy production.

25. The PV cleaning scheduling system of claim 22, wherein said soiling monitoring computer system is further configured to:
receive an irradiance level associated with the soiling sensor; and
determine the soiling rate when the irradiance level exceeds a predefined threshold.

26. The PV cleaning scheduling system of claim 22, wherein said soiling monitoring computer system is further configured to:
receive an irradiance measurement for a location of the PV system;
receive a direct current output associated with the PV system; and
determine the soiling rate by comparing the direct current output to the irradiance measurement.

27. The PV cleaning scheduling system of claim 26, wherein said soiling monitoring computer system is further configured to:
receive a clear sky model; and
adjust the soiling rate based on the clear sky model.

28. The PV cleaning scheduling system of claim 22, wherein said soiling monitoring computer system is further configured to:
determine that a current expected benefit associated with cleaning the PV system currently exceeds a current cost associated with cleaning the PV system; and
transmit an alert indicating that the PV system should be cleaned.

29. A soiling sensor comprising:
a first reference cell;
a second reference cell;
a processor in communication with said first reference cell and said second reference cell;
a memory device in communication with said processor, said processor is configured to:
receive a first measured energy production level from said first reference cell;
receive a second measured energy production level from said second reference cell;
determine a differential energy production between the first measured energy production level and the second measured energy production level;
determine a soiling level and the soiling rate based on the differential energy production;
generate at least one of a plurality of differential alerts and a severity of the alert based on the determined differential energy production; and
transmit an alert indicating that the PV system should be cleaned based on the severity of the generated alert.

30. The soiling sensor of claim 29, further comprising a cleaning device associated with said second reference cell, wherein said soiling sensor is further configured to:
  clean said second reference cell at a regular interval using said cleaning device.

31. The soiling sensor of claim 29, wherein said soiling sensor is in communication with a soiling monitoring computer system, said soiling sensor is further configured to:
  transmit the soiling level and soiling rate to said soiling monitoring computer system.

32. The soiling sensor of claim 29, wherein said soiling sensor further comprises an alerting device configured to provide alerts to a plurality of user devices, said soiling sensor is further configured to:
  transmit an alert to said plurality of user devices when at the soiling level exceeds a threshold level.

* * * * *